US009232274B2

(12) United States Patent
Meuninck et al.

(10) Patent No.: US 9,232,274 B2
(45) Date of Patent: Jan. 5, 2016

(54) APPARATUS FOR ADAPTING A PRESENTATION OF MEDIA CONTENT TO A REQUESTING DEVICE

(75) Inventors: Troy C. Meuninck, Newnan, GA (US); James Carlton Bedingfield, Sr., Lilburn, GA (US); William A. Brown, Woodstock, GA (US); David B. Delorme, Stone Mountain, GA (US); Nadia Morris, Decatur, GA (US); Virginia Ng, Lawrenceville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 273 days.

(21) Appl. No.: 12/839,988

(22) Filed: Jul. 20, 2010

(65) Prior Publication Data
US 2012/0023531 A1 Jan. 26, 2012

(51) Int. Cl.
*H04N 7/173* (2011.01)
*H04N 21/472* (2011.01)
*H04N 21/433* (2011.01)
*H04N 21/4402* (2011.01)

(52) U.S. Cl.
CPC ..... *H04N 21/47202* (2013.01); *H04N 21/4334* (2013.01); *H04N 21/440236* (2013.01)

(58) Field of Classification Search
CPC .......... H04N 7/17318; H04N 21/4334; H04N 21/47214; H04N 13/0497; H04N 13/0404
USPC .......................... 725/134, 142, 80; 348/51–59
See application file for complete search history.

(56) References Cited

U.S. PATENT DOCUMENTS

| | | |
|---|---|---|
| 2,832,821 A | 4/1958 | Du Mont |
| 4,649,425 A | 3/1987 | Pund |
| 5,012,351 A | 4/1991 | Isono et al. |
| 5,293,529 A | 3/1994 | Yoshimura et al. |
| 5,353,269 A | 10/1994 | Kobayashi et al. |
| 5,392,266 A | 2/1995 | Kobayashi et al. |
| 5,465,175 A | 11/1995 | Woodgate |
| 6,014,164 A | 1/2000 | Woodgate |
| 6,115,177 A | 9/2000 | Vossler |
| 6,144,375 A | 11/2000 | Jain et al. |
| 6,188,442 B1 | 2/2001 | Narayanaswami |
| 6,243,054 B1 | 6/2001 | DeLuca |
| 6,285,368 B1 | 9/2001 | Sudo |
| 6,535,241 B1 | 3/2003 | McDowall et al. |
| 6,559,813 B1 | 5/2003 | DeLuca |
| 6,654,721 B2 | 11/2003 | Handelman |
| 6,725,463 B1 | 4/2004 | Birleson |

(Continued)

OTHER PUBLICATIONS

Lin Edwards, "Active Shutter 3D Technology for HDTV", Sep. 25, 2009, 12 pages, http://www.physorg.com/news173082582.html[May 10, 2010 8:12:57 PM].

*Primary Examiner* — Jason Salce
(74) *Attorney, Agent, or Firm* — Guntin & Gust, PLC; Douglas Schnabel

(57) ABSTRACT

A system that incorporates teachings of the present disclosure may include, for example, a media processor having a controller to record stereoscopic media content supplied by a multimedia system, receive from a communication device a request for the recorded stereoscopic media content, determine rendering capabilities of the communication device, generate transcoded content by transcoding the recorded stereoscopic media content according to the rendering capabilities of the communication device, and transmit to the communication device the transcoded content. Other embodiments are disclosed and contemplated.

20 Claims, 20 Drawing Sheets

(56) References Cited

U.S. PATENT DOCUMENTS

| | | |
|---|---|---|
| 6,859,549 B1 | 2/2005 | Oliensis |
| 6,924,833 B1 | 8/2005 | McDowall et al. |
| 6,965,381 B2 | 11/2005 | Kitamura et al. |
| 7,106,358 B2 | 9/2006 | Valliath et al. |
| 7,204,592 B2 | 4/2007 | O'Donnell et al. |
| 7,224,382 B2 | 5/2007 | Baker |
| 7,245,430 B2 | 7/2007 | Kobayashi et al. |
| 7,391,443 B2 | 6/2008 | Kojima et al. |
| 7,613,927 B2 | 11/2009 | Holovacs |
| 7,785,201 B2 | 8/2010 | Hashimoto |
| 7,813,543 B2 | 10/2010 | Modén |
| 8,111,282 B2 | 2/2012 | Cutler et al. |
| 8,117,281 B2 | 2/2012 | Robinson et al. |
| 8,254,668 B2 | 8/2012 | Mashitani |
| 8,305,914 B2 | 11/2012 | Thielman et al. |
| 8,370,873 B2 | 2/2013 | Shintani |
| 8,416,278 B2 | 4/2013 | Kim et al. |
| 8,436,888 B1 | 5/2013 | Baldino et al. |
| 8,456,507 B1 | 6/2013 | Mallappa et al. |
| 8,552,983 B2 | 10/2013 | Chiu |
| 8,675,067 B2 | 3/2014 | Chou et al. |
| 2002/0009137 A1 | 1/2002 | Nelson |
| 2002/0122145 A1 | 9/2002 | Tung |
| 2002/0122585 A1* | 9/2002 | Swift et al. .................... 382/154 |
| 2003/0043262 A1 | 3/2003 | Takemoto |
| 2003/0128273 A1 | 7/2003 | Matsui |
| 2003/0132951 A1 | 7/2003 | Sorokin et al. |
| 2003/0214630 A1 | 11/2003 | Winterbotham |
| 2003/0223499 A1 | 12/2003 | Routhier |
| 2003/0231179 A1 | 12/2003 | Suzuki |
| 2004/0027452 A1 | 2/2004 | Yun |
| 2004/0104864 A1 | 6/2004 | Nakada |
| 2004/0109093 A1 | 6/2004 | Small-Stryker |
| 2004/0218104 A1 | 11/2004 | Smith |
| 2005/0041736 A1 | 2/2005 | Butler-Smith et al. |
| 2005/0066165 A1 | 3/2005 | Peled et al. |
| 2005/0084006 A1 | 4/2005 | Lei |
| 2005/0123171 A1 | 6/2005 | Kobayashi et al. |
| 2005/0169553 A1 | 8/2005 | Maurer |
| 2005/0185711 A1 | 8/2005 | Pfister |
| 2005/0190180 A1 | 9/2005 | Jin et al. |
| 2005/0270367 A1 | 12/2005 | McDowall |
| 2006/0046846 A1 | 3/2006 | Hashimoto |
| 2006/0109200 A1 | 5/2006 | Alden |
| 2006/0161410 A1 | 7/2006 | Hamatani et al. |
| 2006/0203085 A1 | 9/2006 | Tomita |
| 2006/0252978 A1 | 11/2006 | Vesely |
| 2006/0274197 A1 | 12/2006 | Yoo |
| 2007/0039032 A1 | 2/2007 | Goldey et al. |
| 2007/0052672 A1 | 3/2007 | Ritter et al. |
| 2007/0153122 A1 | 7/2007 | Ayite et al. |
| 2007/0171275 A1 | 7/2007 | Kenoyer |
| 2007/0242068 A1 | 10/2007 | Han |
| 2007/0263003 A1 | 11/2007 | Ko et al. |
| 2007/0266412 A1 | 11/2007 | Trowbridge |
| 2007/0296721 A1 | 12/2007 | Chang et al. |
| 2008/0015997 A1* | 1/2008 | Moroney et al. ................ 705/51 |
| 2008/0024454 A1 | 1/2008 | Everest |
| 2008/0044079 A1 | 2/2008 | Chao et al. |
| 2008/0062125 A1 | 3/2008 | Kitaura |
| 2008/0080852 A1 | 4/2008 | Chen |
| 2008/0100547 A1 | 5/2008 | Cernasov |
| 2008/0199070 A1 | 8/2008 | Kim et al. |
| 2008/0247610 A1 | 10/2008 | Tsunoda |
| 2008/0247670 A1 | 10/2008 | Tam et al. |
| 2008/0256572 A1* | 10/2008 | Chen ............................... 725/32 |
| 2008/0303896 A1 | 12/2008 | Lipton |
| 2008/0310499 A1 | 12/2008 | Kim |
| 2009/0096858 A1 | 4/2009 | Jeong et al. |
| 2009/0100474 A1 | 4/2009 | Migos |
| 2009/0122134 A1 | 5/2009 | Joung et al. |
| 2009/0128620 A1 | 5/2009 | Lipton |
| 2009/0160934 A1 | 6/2009 | Hendrickson et al. |
| 2009/0174708 A1 | 7/2009 | Yoda et al. |
| 2009/0278917 A1 | 11/2009 | Dobbins et al. |
| 2009/0310851 A1 | 12/2009 | Arcas et al. |
| 2009/0315977 A1 | 12/2009 | Jung |
| 2009/0319178 A1 | 12/2009 | Khosravy |
| 2010/0007582 A1 | 1/2010 | Zalewski |
| 2010/0013738 A1 | 1/2010 | Covannon |
| 2010/0026783 A1 | 2/2010 | Chiu et al. |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane et al. |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0114783 A1 | 5/2010 | Spolar |
| 2010/0134411 A1 | 6/2010 | Tsumura |
| 2010/0150523 A1 | 6/2010 | Okubo |
| 2010/0171697 A1 | 7/2010 | Son et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0235871 A1 | 9/2010 | Kossin |
| 2010/0303442 A1 | 12/2010 | Newton et al. |
| 2010/0306800 A1 | 12/2010 | Jung et al. |
| 2010/0309287 A1 | 12/2010 | Rodriguez |
| 2010/0315494 A1* | 12/2010 | Ha et al. ............................ 348/53 |
| 2011/0001806 A1 | 1/2011 | Nakahata |
| 2011/0012896 A1 | 1/2011 | Ji |
| 2011/0012992 A1 | 1/2011 | Luthra |
| 2011/0029893 A1 | 2/2011 | Roberts et al. |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn et al. |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1* | 7/2011 | Fortin et al. ...................... 348/43 |
| 2011/0164122 A1 | 7/2011 | Hardacker |
| 2011/0193946 A1 | 8/2011 | Apitz |
| 2011/0199460 A1 | 8/2011 | Gallagher |
| 2011/0199469 A1 | 8/2011 | Gallagher |
| 2011/0211049 A1 | 9/2011 | Bassali et al. |
| 2011/0221874 A1 | 9/2011 | Oh |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1* | 10/2011 | Fahrny et al. ................... 725/47 |
| 2011/0267437 A1 | 11/2011 | Abeloe |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1* | 11/2011 | Obana et al. ................... 386/343 |
| 2011/0298803 A1 | 12/2011 | King et al. |
| 2011/0301760 A1 | 12/2011 | Shuster et al. |

(56) References Cited

U.S. PATENT DOCUMENTS

| | | |
|---|---|---|
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050507 A1 | 3/2012 | Keys |
| 2012/0092445 A1 | 4/2012 | McDowell et al. |
| 2012/0169730 A1 | 7/2012 | Inoue |
| 2012/0169838 A1 | 7/2012 | Sekine |
| 2012/0206558 A1 | 8/2012 | Setton et al. |
| 2012/0249719 A1 | 10/2012 | Lemmey et al. |
| 2012/0274731 A1 | 11/2012 | Shanmukhadas et al. |
| 2012/0327174 A1 | 12/2012 | Hines et al. |

* cited by examiner

Polarized Display

700

Polarized Display

1800

2400

APPARATUS FOR ADAPTING A PRESENTATION OF MEDIA CONTENT TO A REQUESTING DEVICE

FIELD OF THE DISCLOSURE

The present disclosure relates generally to media content presentation techniques and more specifically to an apparatus for adapting a presentation of media content to a requesting device.

BACKGROUND

Media consumption has become a multibillion dollar industry that continues to grow rapidly. Beginning with the advent of compact audio and video formats such as MPEG-3 and MPEG-4, these technologies have made it easy for users to port music and video into portable devices such as cellular phones, and media players in very small form factors. Because of the small file size produced by these media formats, Flash memory has in large part replaced compact hard drives previously used by these portable devices, thereby improving their durability and battery life.

High resolution displays such as high definition television (or HDTV) and high resolution computer monitors can now present two-dimensional (2D) movies and games with three-dimensional (3D) perspective with clarity never seen before. Consequently, home viewing of high resolution content has become very popular. Additionally, high resolution displays have helped to increase the popularity of gaming consoles among teenagers and adults. With high speed Internet access, gaming console manufacturers are now able to support multiuser games over broadband connections without sacrificing video resolution.

Movie producers are beginning to focus their efforts on producing 3D movies that require 3D viewing glasses. Some blockbuster 3D movies such as Avatar™ have motivated manufacturers to produce television sets that support 3D viewing with polarized glasses.

Collectively, improvements in viewing, audio, and communication technologies are causing rapid demand for consumption of all types of media content.

BRIEF DESCRIPTION OF THE DRAWINGS

FIGS. 1-2 depict illustrative embodiments of communication systems that provide media services;

DETAILED DESCRIPTION

Figure 2:
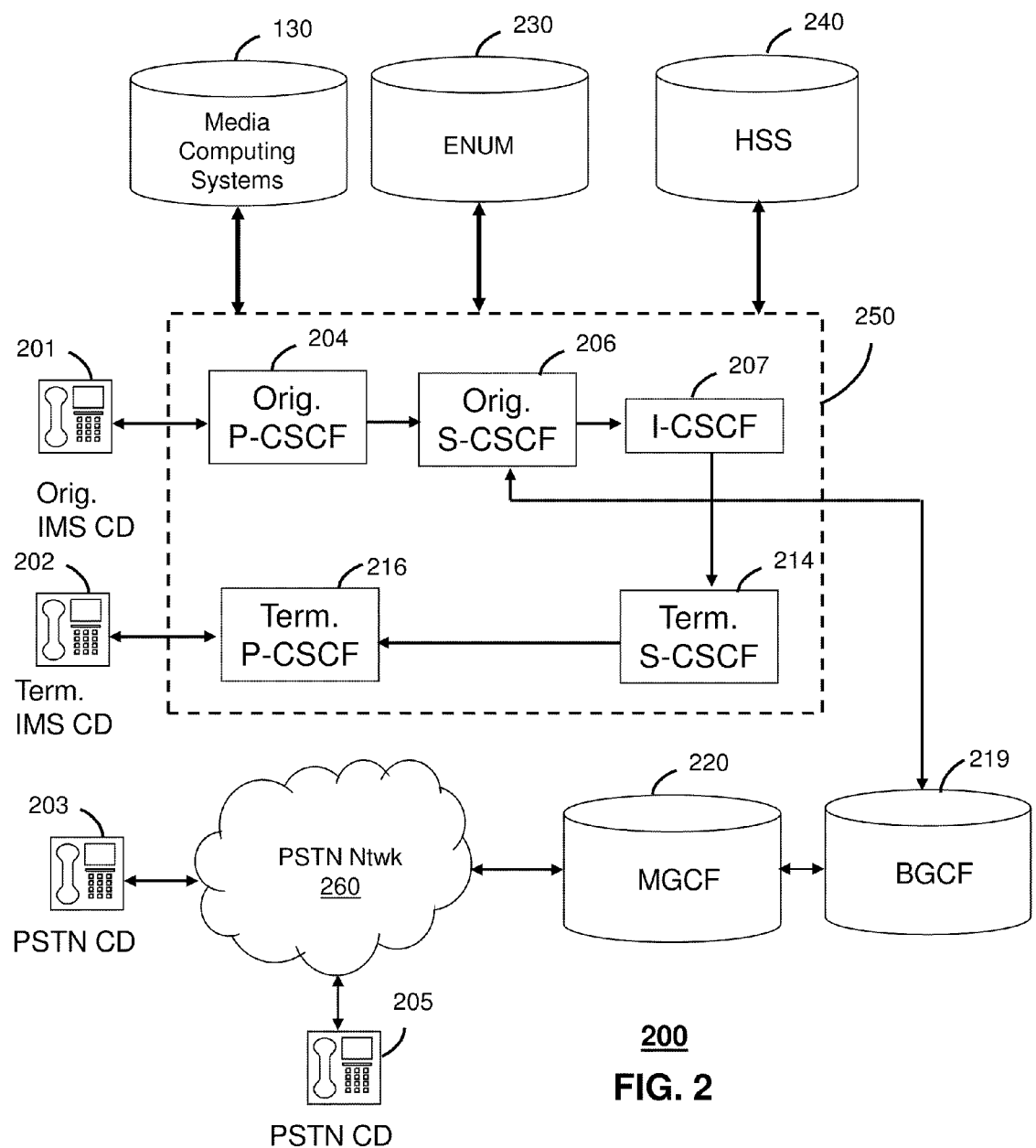

One embodiment of the present disclosure can entail a media processor having a controller to record stereoscopic media content supplied by a multimedia system, receive from a communication device a request for the recorded stereoscopic media content, determine rendering capabilities of the communication device, generate transcoded content by transcoding the recorded stereoscopic media content according to the rendering capabilities of the communication device, and transmit to the communication device the transcoded content.

One embodiment of the present disclosure can entail a non-transitory computer-readable storage medium having computer instructions to record stereoscopic media content, receive from a requesting device a request for the recorded stereoscopic media content, transcode the recorded stereoscopic media content according to rendering capabilities of the requesting device, and transmit to the requesting device the transcoded content.

One embodiment of the present disclosure can entail a method for transmitting from a requesting device to a digital video recorder (DVR) a request for recorded stereoscopic media content, and receiving at the requesting device transcoded content from the DVR. The DVR is operable to transcode the recorded stereoscopic media content according to rendering capabilities of the requesting device.

Figure 1:
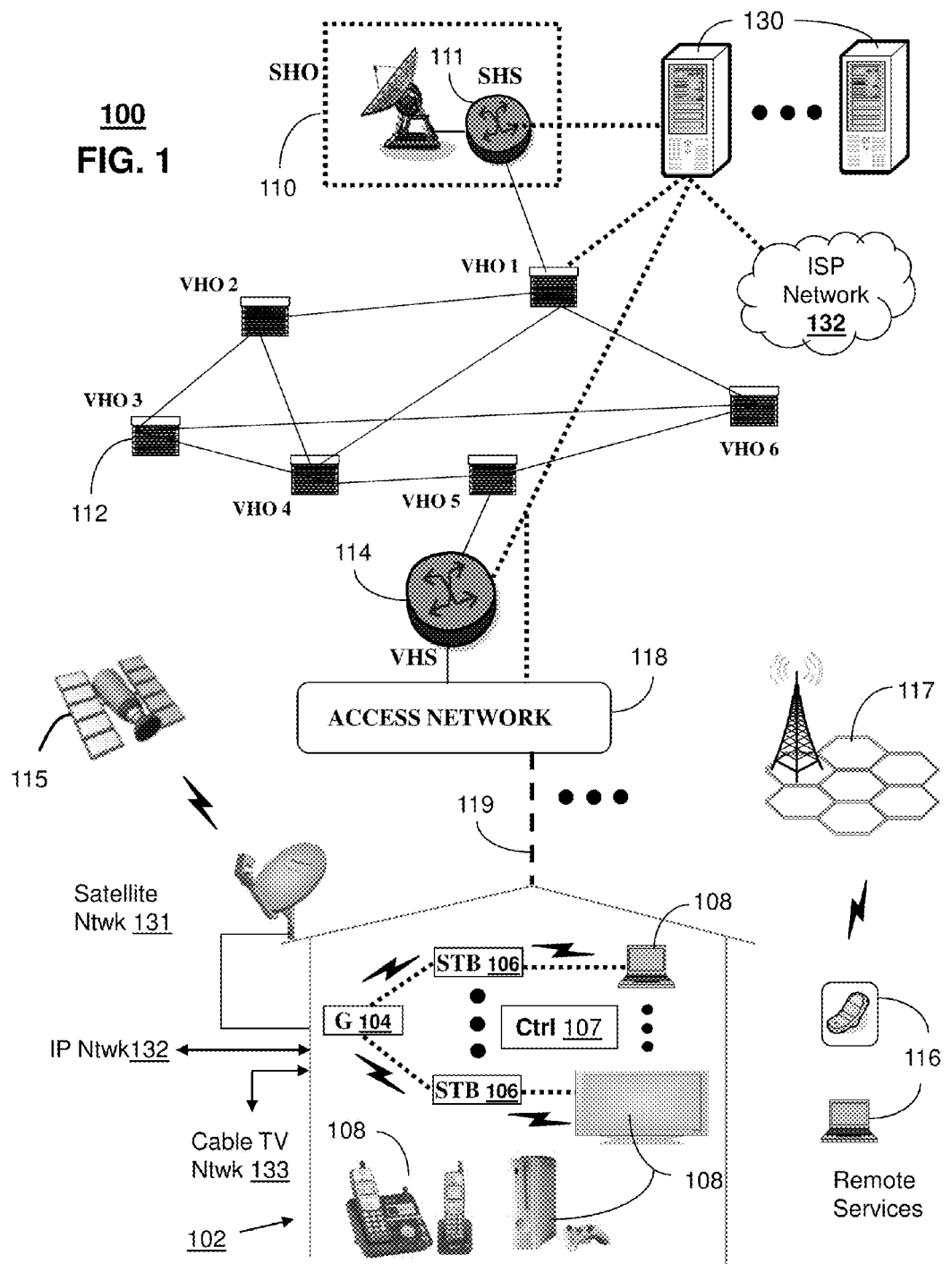

FIG. 1 depicts an illustrative embodiment of a first communication system 100 for delivering media content. The communication system 100 can represent an Internet Protocol Television (IPTV) broadcast media system although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers, television sets, gaming consoles (e.g., PS3, Xbox or Wii) managed in some instances by a media controller 107 (such as an infrared or RF remote control, gaming controller, etc.).

The gateway 104, the media processors 106, and media devices 108 can utilize tethered interface technologies (such as coaxial, phone line, or power line wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130. A portion of the computing devices 130 can operate as a web server for providing portal services over an Internet Service Provider (ISP) network 132 to wireline media devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, LTE, and so on).

A satellite broadcast television system can be used in place of the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It is contemplated that the present disclosure can apply to any present or next generation over-the-air and/or landline media content services system.

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is generally not used when a communication session involves IMS CD to IMS CD communications. Any communication session involving at least one PSTN CD may utilize the MGCF 220.

IMS CDs 201, 202 can register with the IMS network 250 by contacting a Proxy Call Session Control Function (P-CSCF) which communicates with a corresponding Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

The first communication system 100 can be operatively coupled to the second communication system 200 by way of computing systems 130 (or other common communication means) to interchangeably share services between said systems.

Figure 3:
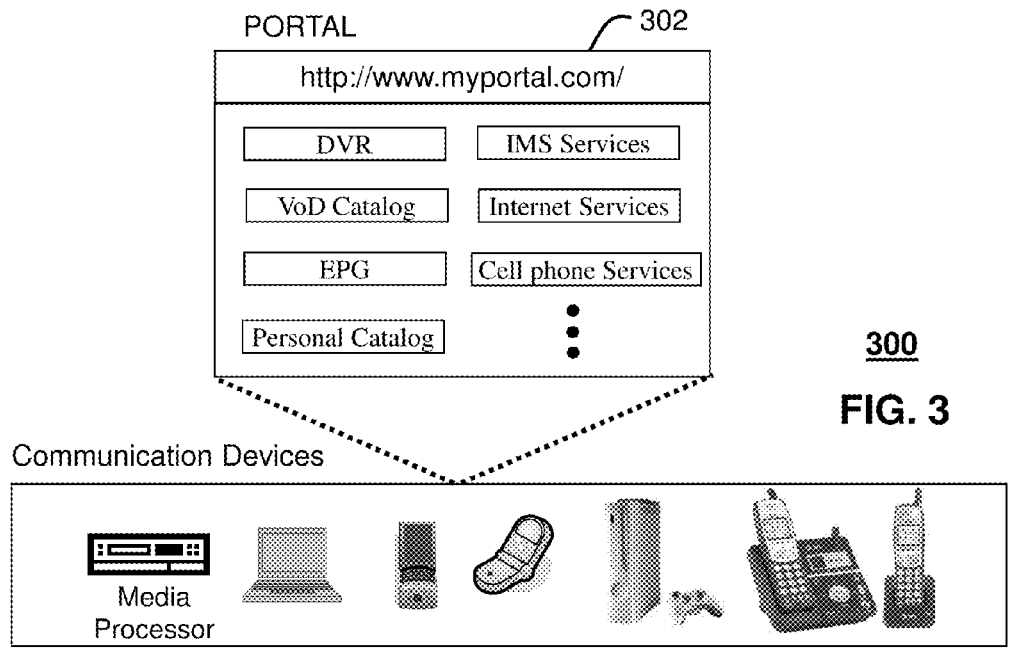
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication system 100 illustrated in FIG. 1. The portal 302 can be used for managing services of communication systems 100-200. The portal 302 can be accessed by a Uniform Resource Locator (URL) with a common Internet browser using an Internet-capable communication device such as those illustrated FIGS. 1-2. The portal 302 can be configured, for example, to access a media processor 106 and services managed thereby such as a Digital Video Recorder (DVR), a VoD catalog, an EPG, a video gaming profile, a personal catalog (such as personal videos, pictures, audio recordings, etc.) stored in the media processor, to provision IMS services described earlier, provisioning Internet services, to provision cellular phone services, and so on.

Figure 4:
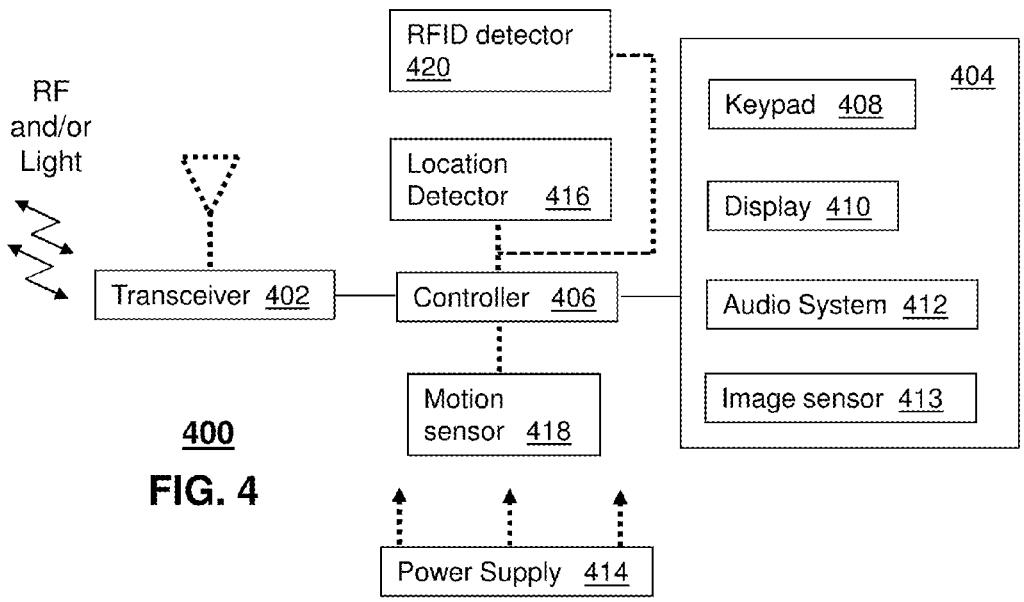
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2 and other communication devices described herein. The communication device 400 can comprise a wireline and/or wireless transceiver 402 (herein transceiver 402), a user interface (UI) 404, a power supply 414, a location detector 416, and a controller 406 for managing operations thereof. The transceiver 402 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio for hands free operation. The audio system 412 can further include a microphone for receiving audible signals from an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location detector 416 can utilize common location technology such as a global positioning system (GPS) receiver for identifying a location of the communication device 400 based on signals generated by a constellation of GPS satellites, thereby facilitating common location services such as navigation.

The motion sensor 418 can comprise common motion sensing technology such as an accelerometer, gyros, or like technologies that can sense two or three-dimensional motion. Alternatively, or in combination, the motion sensor 418 can comprise infrared sensor technology which can detect infrared beams from a source for purposes of detecting motion (much like the technology used in Wii™ gaming consoles). In sum, the motion sensor 418 can utilize any technology that can detect two or three dimensional motion.

The RFID detector 420 can comprise common RFID tag detection and communication technology. The RFID detector 420 can for example utilize a portion or all of the transceiver 402 technology to communicate and prompt active or passive RFID tags to respond with identification information such as the identification data associated with a viewing apparatus comprising an RFID tag. Alternatively, the RFID detector 420 can include its own transceiver technology for communicating with RFID tags.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media controller 107, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
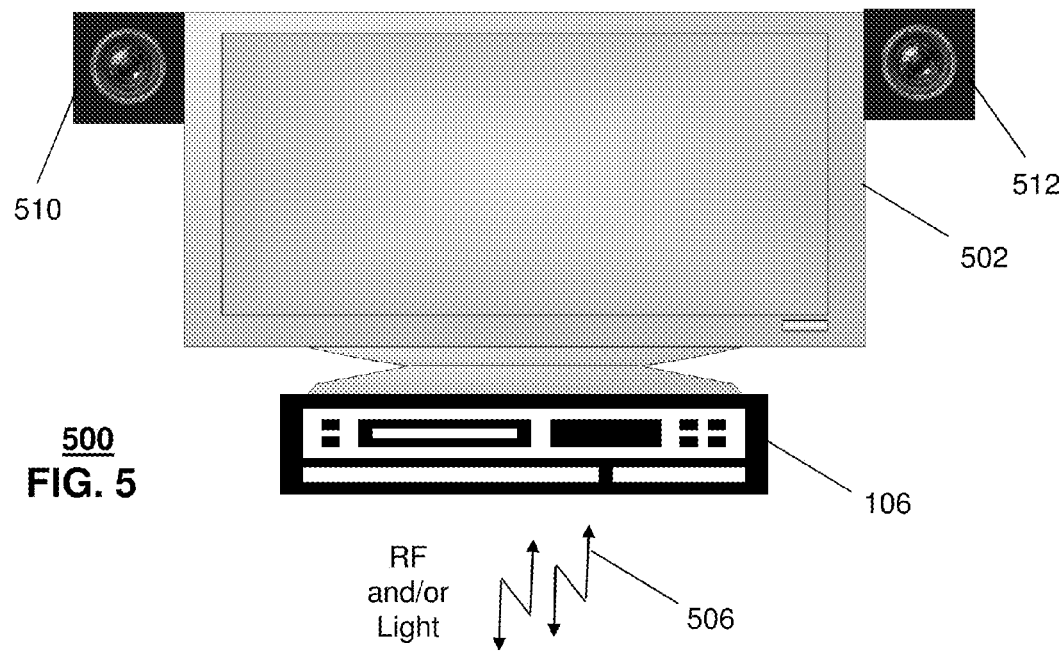
FIG. 5 depicts an illustrative embodiment of a presentation device and media processor for presenting media content.

FIG. 5 depicts an illustrative embodiment of a presentation device 502 and media processor 106 for presenting media content. In the present illustration, the presentation device 502 is depicted as a television set. It will be appreciated that the presentation device 502 alternatively can represent a portable communication device such as a cellular phone, a PDA, a computer, or other computing device with the ability to display media content. The media processor 106 can be an STB such as illustrated in FIG. 1, or some other computing device such as a cellular phone, computer, gaming console, or other device that can process and direct the presentation device 502 to emit images associated with media content. It is further noted that the media processor 106 and the presentation device 502 can be an integral unit. For example, a computer or cellular phone having computing and display resources collectively can represent the combination of a presentation device 502 and media processor 106.

The presentation device 502 can be coupled to a plurality of imaging sensors 510, 512. The imaging sensors 510, 512 can utilize common imaging technology such as CCD (Charge Coupled Device) technology to capture moving or still images. The plurality of imaging sensors 510, 512 can be utilized, for example, to capture images of a user utilizing the viewing apparatus 602 of FIG. 6 and/or a media controller 630 (illustrated as a remote controller, herein remote controller 630). The captured images can be processed by the media processor 106 as will be described below.

Figure 6:
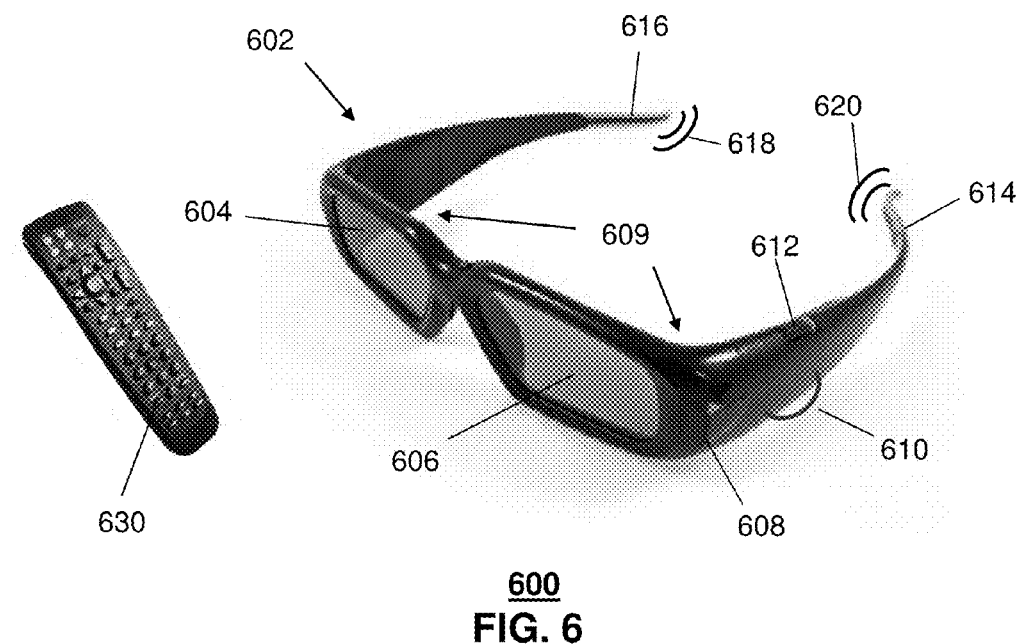
FIG. 6 depicts an illustrative embodiment of a viewing apparatus.

The media processor 106 can be adapted to communicate with accessories such as the viewing apparatus 602 of FIG. 6 by way of a wired or wireless interface 506. A wired interface can represent a tethered connection from the viewing apparatus to an electro-mechanical port of the media processor 106 (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 602 is contemplated by the presented disclosure.

The viewing apparatus 602 can represent an apparatus for viewing two-dimensional (2D) or three-dimensional (3D) stereoscopic images which can be still or moving images. The viewing apparatus 602 can be an active shutter viewing apparatus. In this embodiment, each lens has a liquid crystal layer which can be darkened or made to be transparent by the application of one or more bias voltages. Each lens 604, 606 can be independently controlled. Accordingly, the darkening of the lenses 604, 606 can alternate, or can be controlled to operate simultaneously.

Each viewing apparatus 602 can include all or portions of the components of the communication device 400 illustrated in FIG. 4. For example, the viewing apparatus 602 can utilize the receiver portion of the transceiver 402 in the form of an infrared receiver depicted by the window 608. Alternatively, the viewing apparatus 602 can function as a two-way communication device, in which case a full infrared transceiver could be utilize to exchange signals between the media processor 106 and the viewing apparatus 602. It is contemplated that the transceiver 402 can be replaced with a unidirectional RF receiver or a bidirectional RF transceiver. The viewing apparatus 602 can also include a passive or active RFID tag embedded in the housing assembly (or window 608—not shown in FIG. 6) for transmitting RF signals to the STB 106 responsive to a signal transmitted by the RFID detector 420 of the STB as previously discussed. The signal transmitted by the RFID tag of the viewing apparatus can be used to identify the viewing apparatus by any common coding scheme (e.g., alpha-numeric character string).

Window 608 can also include one or more common light sensors that measure ambient light and/or measure light signals supplied from the presentation device 502. Alternatively or in combination, one or more light sensors can also be placed on an inner portion 609 of the viewing apparatus 602 to measure light supplied by the optical elements 604, 606 or reflections of light from a user's eyes (e.g., sclera or eyelid flesh). The measurements of light generate illumination information which can be transmitted to the media processor 106.

The viewing apparatus 602 can utilize a controller 406 to control operations thereof, and a portable power supply (not shown). The viewing apparatus 602 can have portions of the UI 404 of FIG. 4. For example, the viewing apparatus 602 can have a multi-purpose button 612 which can function as a power on/off button and as a channel selection button. A power on/off feature can be implemented by a long-duration depression of button 612 which can toggle from an on state to an off state and vice-versa. Fast depressions of button 612 can be used for channel navigation. Alternatively, two buttons can be added to the viewing apparatus 602 for up/down channel selection, which operate independent of the on/off power button 612.

In another embodiment, a thumbwheel can be used for scrolling between channels. Additional buttons, a scroll wheel or other common manipulative devices (not shown) can be added to the viewing apparatus 602 to also control light intensity produced by the presentation device 502. For example increase and decrease buttons can be used to submit illumination requests to the media processor 106 over a wireless or wired medium as previously described. Alternatively or in combination any of the aforementioned functions of the UI 404 of the viewing apparatus can be controlled by speech detection. A microphone of the audio system 412 can added to the housing assembly of the viewing apparatus 602 for speech detection purposes. The microphone can for example be an extendable leg that reaches at or near the mouth of a user much like common headsets in prior art systems. Advanced microphone detection technology that takes advantage of aspects of a user's physiology (bone vibrations at or near the user's ear) can be used by the viewing apparatus 602 for speech detection.

It is further noted that illumination information generated by the light sensor(s) and requests for a change in light intensity can be submitted in combination to the media processor 106, presentation device 502 or combinations thereof.

The viewing apparatus 602 can also include an audio system 412 with one or more speakers in the extensions of the housing assembly such as shown by references 616, 614 to produce localized audio 618, 620 near a user's ears. Different portions of the housing assembly can be used to produce mono, stereo, or surround sound effects. Ear cups (not shown) such as those used in headphones can be used by the viewing apparatus 602 (as an accessory or integral component) for a more direct and low-noise audio presentation technique. The volume of sound presented by the speakers 614, 616 can be controlled by a thumbwheel 610 (or up/down buttons—not shown).

As will be described below, the media processor 106 can assign a remote controller 630 to one or more viewing apparatus 602 as an accessory for controlling functions of the media processor 106 such as volume, channel selection, resolution (2D to 3D and vice-versa), illumination control, navigation, contrast, color, and so on.

It would be evident from the above descriptions that many embodiments of the viewing apparatus 602 are possible, all of which are contemplated by the present disclosure.

Figure 7:
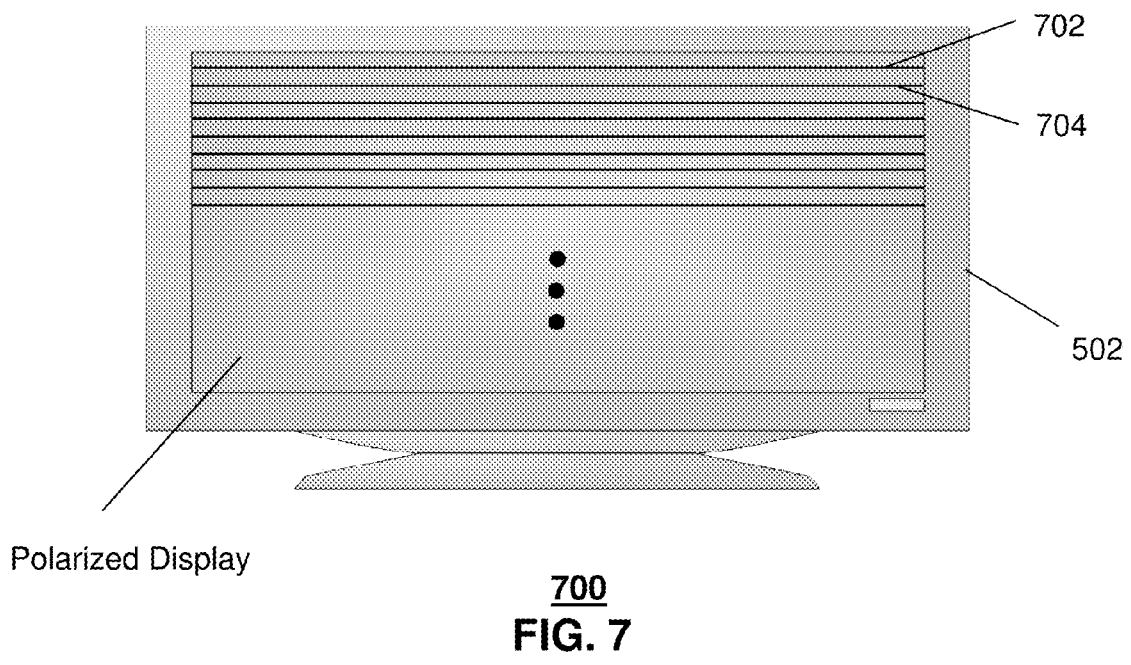
FIG. 7 depicts an illustrative embodiment of a presentation device with a polarized display.

FIG. 7 depicts an illustrative embodiment of the presentation device 502 of FIG. 5 with a polarized display. A display can be polarized with polarization filter technology so that alternative pixel rows can be made to have differing polarizations. For instance, odd pixels rows 702 can be polarized for viewing with one polarization filter, while even pixels rows 704 can be polarized for viewing with an alternative polarization filter. The viewing apparatus 602 of FIG. 6 can be adapted to have one lens polarized for odd pixel rows, while the other lens is polarized for viewing even pixel rows. With polarized lenses, the viewing apparatus 602 can present a user a 3D stereoscopic image.

Figure 8:
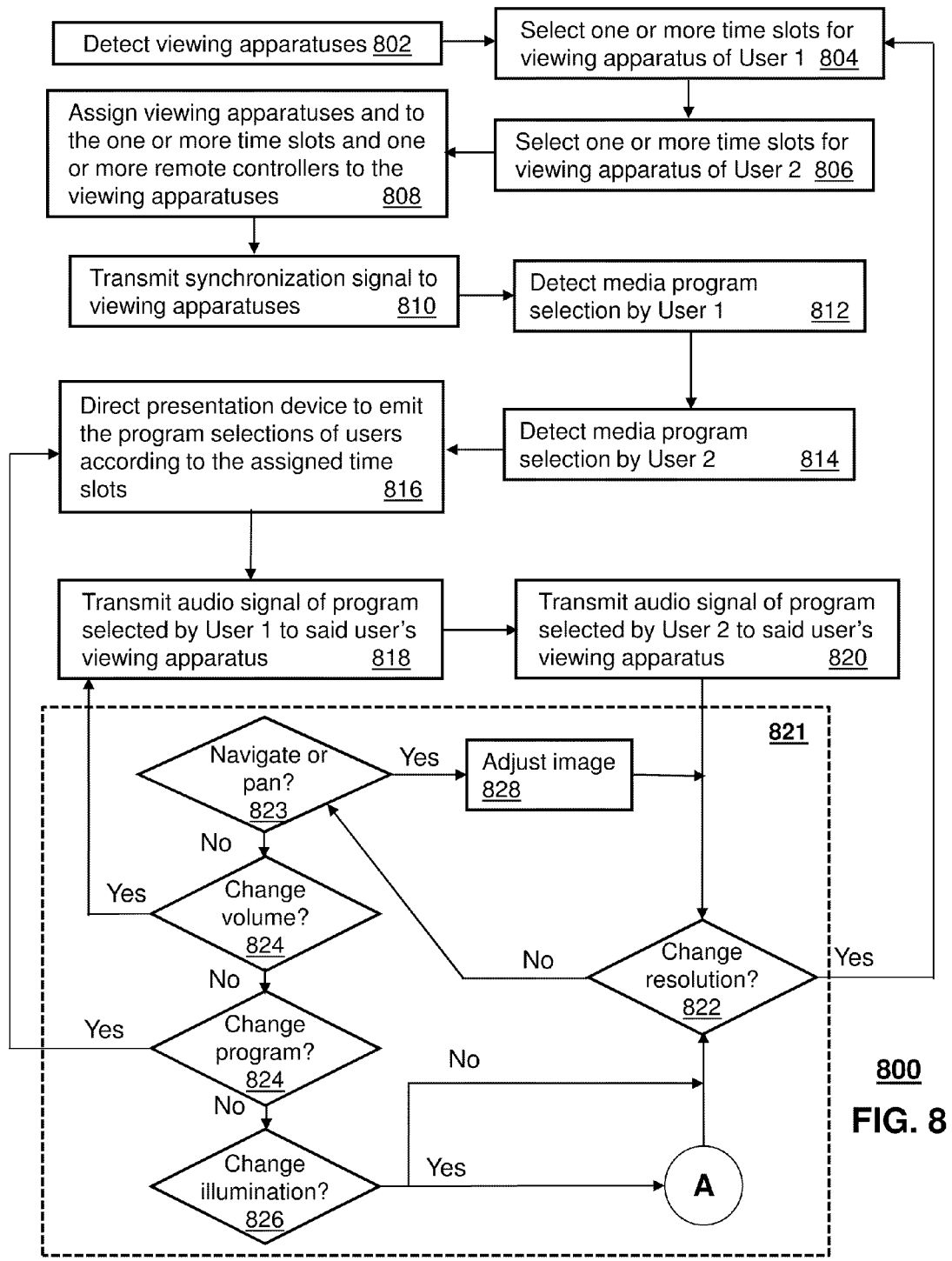
FIGS. 8-9 depict illustrative embodiments of a method operating in portions of the devices and systems of FIGS. 1-7.

FIG. 8 depicts an illustrative embodiment of a method 800 operating in portions of the devices and systems described herein and/or illustrated in FIGS. 1-7. Method 800 can begin with step 802 in which a media processor 106 (such as a STB) detects a plurality of viewing apparatuses such as the viewing apparatus 602 of FIG. 6. For illustration purposes only, the media processor 106 and the viewing apparatuses 602 will be referred to hereinafter as the STB 106 and shutter glasses 602, respectively, although it is well understood that these terms have a broader meaning.

Figure 19:
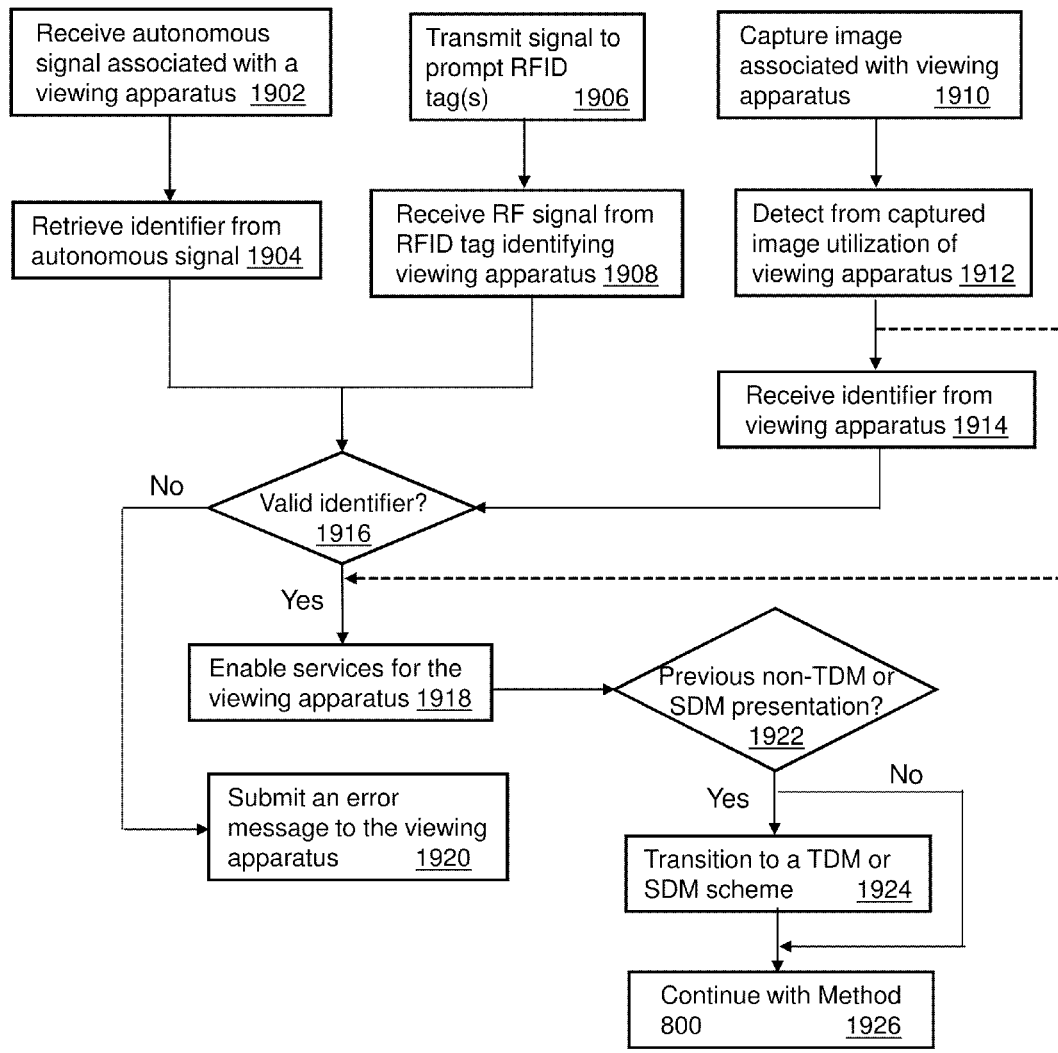
FIG. 19 depicts an illustrative embodiment of a method operating in portions of the devices and systems of FIGS. 1-7.

The detection of the shutter glasses 602 in step 802 can be illustrated by the flowchart of FIG. 19. FIG. 19 provides a non-limiting illustration for detecting shutter glasses 602. Before describing these embodiments it is noted that it would be apparent to an artisan with ordinary skill in the art that there are multiple ways for a media processor 106 to detect viewing apparatuses 602. It would also apparent to said artisan that it would be impractical to describe all possible embodiments in the present disclosure. The present disclosure therefore contemplates the use of any embodiment not disclosed herein for detecting any type of viewing apparatus suitable for the present disclosure.

In one embodiment, the STB 106 can be operable to receive in step 1902 an autonomous signal associated with shutter glasses 602. The autonomous signal can be generated by a remote controller 630 that notifies the STB 106 of the intended use of shutter glasses 602. The notification process can take place while the remote controller 630 navigates through a user interface presented by the STB 106 by way of a presentation device 502, or by depressing one or more buttons on the remote controller 630. Alternatively, the autonomous signal can be transmitted by the shutter glasses 602 over a wireless medium using RF or infrared (IR) signals.

The shutter glasses 602 can be adapted to transmit the autonomous signal in response to a user turning the power on the shutter glasses 602, an audio system of the shutter glasses 602 detecting a speech command that it conveys to the STB 106 inclusive of the autonomous signal, or the shutter glasses can be equipped with the motion sensor 418 of FIG. 4 which can be used to detect that the glasses have been retrieved from a stationary (non-use) position, thereby triggering a wireless transmission (e.g., RFID signal, or infrared, Bluetooth or otherwise) of the autonomous signal to notify the STB 106 that the glasses are in use. The shutter glasses can also be equipped with a power on-off switch based on the position of the legs of the glasses 602. For example, when the glasses are folded, the switch can automatically turn off power. When the legs of the glasses 602 are unfolded, power is restored which can in turn trigger an autonomous signal that is conveyed to the STB 106 to signal the use of the glasses.

A power-on cycle can for example invoke the shutter glasses 602 to transmit its identifier (e.g., alphanumeric or binary string) to the STB 106 for validation and to enable a request for services. Similarly, a speech command once received by the STB 106 can be used for validation and service activation purposes. In step 1904, the STB 106 can retrieve the identifier and in step 1916 perform a validation process. The validation process can involve comparing the identifier to a database of known identifiers stored in the STB 106—preprovisioned by the service provider of the STB 106 and/or at a later time by the subscriber of the STB 106. The identifier can also include information such as service provider identification data (identifiable by MAC address, serial number, model number, etc.). With this information, the STB 106 can determine if the service provider identification is compatible with the service provider identification known to the STB 106. The STB 106 can therefore be adapted to enforce the use of shutter glasses 602 and/or other accessories such as the remote controller 630 supplied by the service provider of the STB 106.

In the case of speech commands, the STB 106 can be adapted in step 1916 to validate the identifier with biometric techniques such as user voice identification. Alternatively, or in combination, the STB 106 can submit an audio signal to the shutter glasses 602 to request from the user a login and/or password in the voice of the user, which the shutter glasses 602 can detect and convey back to the STB 106 for processing.

If the identifier is found to be invalid in step 1916, the STB 106 can submit in step 1920 an error message to the shutter glasses 602 in the form of an audio signal indicating that the validation process has failed. Otherwise, if the identifier is found to be valid in step 1916, the STB 106 enables services for the detected shutter glasses in step 1918, and proceeds to step 1922 where it determines if the STB 106 was previously configured to present media content in a non-time-division multiplexing (TDM) or non-space-division multiplexing (SDM). As will be shown below, the STB 106 is capable of directing the presentation device 502 to present multiple instances of media content with overlapping presentation schedules simultaneously by the use of TDM or SDM schemes.

If a traditional presentation scheme where a single instance of media content is presented at a time by the presentation device 502, and shutter glasses 602 are detected as described above during this presentation mode, then the STB 106 can proceed to step 1924 where it can flag the need to transition to a TDM or SDM scheme suitable for the detected glasses 602. Otherwise, the STB 106 proceeds to step 1926 where it proceeds to method 800 beginning from step 804. The transition from a non-multiplexing scheme to a TDM or SDM scheme can represent that the STB 106 will have to discontinue the non-multiplexing scheme and inform users by an ambient audio message or by a message on the presentation device 502 while in the non-multiplexing presentation scheme that shutter (and/or polarized) glasses 602, or other accommodations will be required to continue viewing media content.

In yet another embodiment, the STB 106 can detect shutter glasses 602 by directing the RFID detector 420 of the STB 106 to transmit in step 1906 an RF signal that prompts an RFID tag embedded in the shutter glasses 602 to respond with an identifier in step 1908. Once the identifier is received, the STB 106 can proceed to steps 1916-1926 as previously described. In yet another embodiment, the STB 106 can be adapted to capture one or more images of a user selecting or otherwise manipulating the shutter glasses 602 or entering a room with the shutter glasses 602 by capturing images by way of one or both of the imaging sensors 510, 512 in FIG. 5. From the captured image, the STB 106 can utilize common image processing technology to detect the utilization of the shutter glasses 602. Once detected, the STB 106 can prompt the shutter glasses 602 to supply over a wireless medium an identifier in step 1914, which would then be validated and processed as described by steps 1916-1926. Alternatively, if the user's image is recognized, the STB 106 can bypass steps 1914-1916 and enable services of the shutter glasses 602.

For illustration purposes, assume that only two shutter glasses are detected. In steps 804 through 808 the STB 106 can select and assign each shutter glass 602 to one or more time slots. In step 808, the STB 106 can also assign a remote controller 630 to each of the shutter glasses 602. If one or more of the shutter glasses 602 shares the same time slot assignments, then these glasses can be grouped and assigned to a single remote controller 630. The STB 106 can perform the assignment by identifying the remote controllers 630 and the shutter glasses 602 according to identifications (ID) transmitted thereby. The ID can be a number or alphanumeric string transmitted by the remote controllers 630 and/or the shutter glasses 602 each time either device transmits a signal to the STB 106 over a wireless medium (e.g., an infrared, Bluetooth or WiFi signal) or wireline medium (e.g., USB cable).

In step 810, the STB 106 can transmit to each shutter glass a synchronization signal over the RF or IR interface. The synchronization signal can include an identifier for each shutter glass 602 (e.g., shutter glass ID 1, and shutter glass ID 2), a designation of one or more periodic time slots assigned to each shutter glass, and the frequency of these time slots (e.g., 32 frames per second).

In steps 812, 814 the STB 106 can further detect a program selection by each user. The selections can be detected from RF or IR signals transmitted by a remote controller 630 utilized by each user. Each remote controller 630 can be identified by a unique identifier as previously described. Alternatively, or in combination, each shutter glass 602 can have one or more channel selection buttons for scrolling through channels presented at the TV set 502 by the STB 106. A program selection in the present context can represent one of many selectable media programs supplied to the STB 106 by one of the media communication systems referred to in FIGS. 1-3, or media programs stored in the STB's local memory. A media program can represent a live TV channel (e.g., ESPN), a pre-recorded program stored in a DVR of the STB 106, personal media content such as pictures or videos stored in the STB, or any other source of media content that is presentable on TV set 502. Accordingly, a media program can represent any form of viewable media content which can have still or moving images.

Once a media program selection has been detected, the STB 106 can direct the TV set 502 in step 816 to emit images of each program according to the time slots assigned to each set of shutter glasses 602. In steps 818, 820, time-synchronized audio signals can be transmitted to the shutter glasses 602 of Users 1 and 2 by way of RF or IR signals. The shutter glasses 602 can each process the audio signal with a built-in audio system such as described for reference 412 of FIG. 4 for presenting low-volume audio associated with the selected program by way of the audio speakers located on the extensions 616, 620 of the shutter glasses 602. Volume can be controlled at each of the shutter glasses 602 by way of the volume control 610. By utilizing low volume audio, each user can receive a private audio presentation of the program, thereby not disturbing another user viewing a different program.

Step 821 represents a user interface (UI) with several illustrative embodiments for controlling a presentation of images by the presentation device 502 directed to each of the shutter glasses 602 at their respective assigned time slots. By way of the UI, a user can request a change of resolution at step 822 (as will be described below), navigation or panning of the UI and/or the media program presented by the presentation device 502 as directed by the STB 106 at step 823, a request for a change in volume in the audible signal transmitted to the shutter glasses 602 at step 824 (as described above), a change in the media program at step 824 as described above for steps 812 and 814, or a change of illumination at step 826 as will be described below.

The UI can be invoked and controlled by several devices individually or in combination. For example, the UI can be invoked by a manipulation of the remote controller 630, a speech command detected by an audio system of the shutter glasses 602, or an action of the user detected by the imaging sensors 510 or 512 operably coupled to the STB 106. In the case of the remote controller 630 the UI can be managed by buttons on the controller 630 (e.g., volume control, channel control, DVR control, etc.). In addition, the motion sensor 418 (and/or the location detector 416) can be used to detect motion that can be interpreted as a navigation command to control a pointer in the UI (much like a mouse pointer on a computer) or to pan the UI or the media program when either of these images is presented on a canvas that exceeds the presentation area of the presentation device 502.

Figure 18:
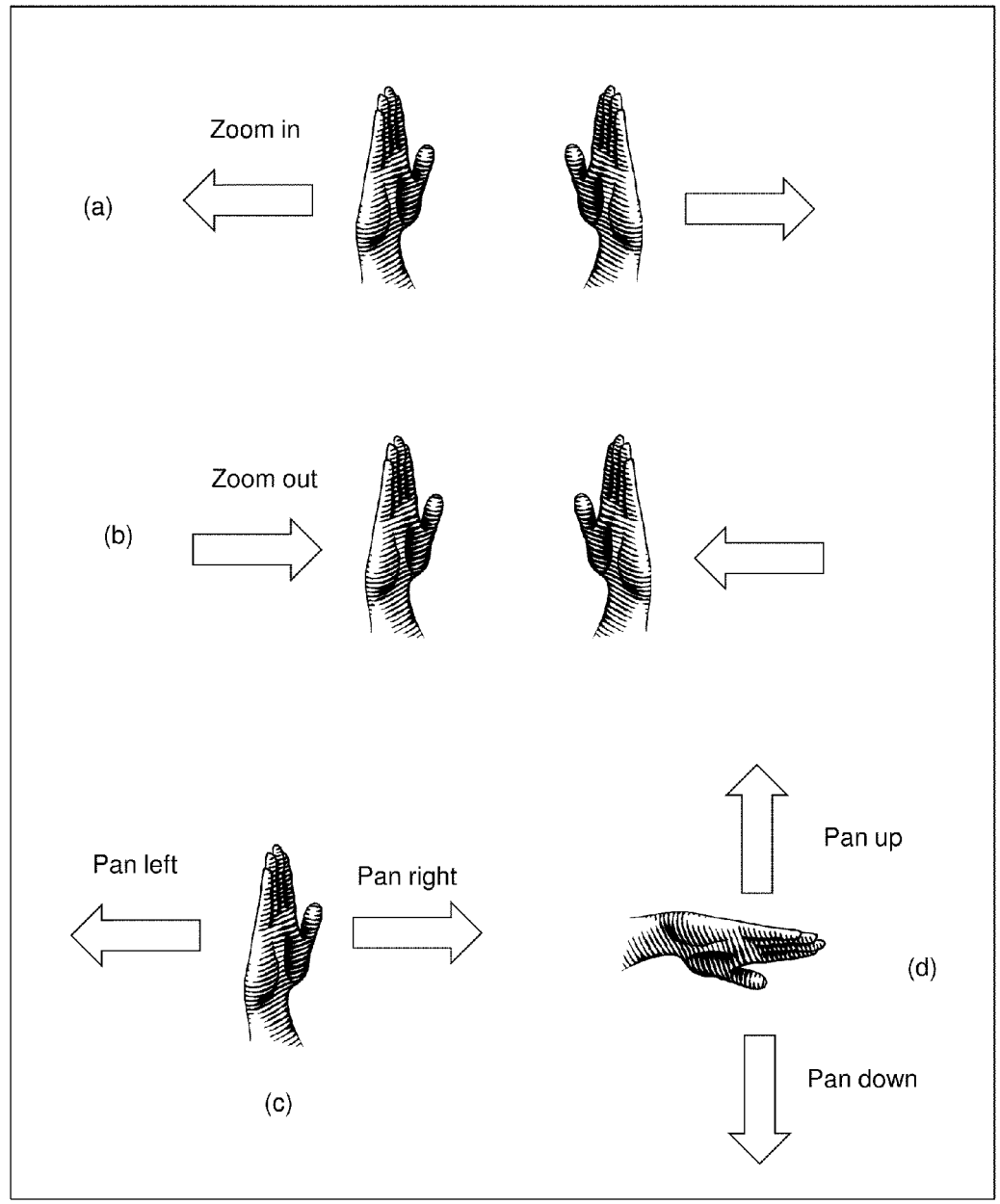

The imaging sensors 510, 512 can detect an action by the user such as movement of the remote controller 630 or hand motions of the user. FIG. 18 depicts illustrative hand motion commands that can be detected by the imaging sensors 510, 512 to control the UI and/or media program being presented. For example, movement of the hands outward can be interpreted as a zoom in command which can be used to augment a portion of the image being presented in 2D or 3D format. An inward movement can be interpreted as a zoom out command which can be used to shrink the image being presented as well as draw in a portion of the image that was not previously viewable. This is especially useful when the canvas of the image being presented is larger than the presentable area of the presentation device 502. Single hand motions from left to right, right to left, up and down, or at angles not shown can be used to pan the image presentation in different directions.

The imaging sensors 510, 512 can also be used by the STB 106 to detect 3D positioning of a user's hands. Accordingly, a user viewing a 3D image can manipulate a 3D object presented by the presentation device 502 as if the user were actually touching the object in 3D space.

It would be evident to an artisan with ordinary skill in the art that there can be multiple embodiments for manipulating a UI or media presentation with any of the devices described above. Such embodiments are therefore contemplated by the present disclosure.

Assume for illustration purposes that the media program selected by each user is a 3D video program with right and left images having different perspectives for stereoscopic viewing. The STB 106 can select for user 1 time slot 1 for viewing left video images and time slot 2 for viewing right video images, each time slot having a frame rate of 32 frames per second. Similarly, the STB 106 can select for user 2 time slot 3 for viewing left video images and time slot 4 for viewing right video images, each time slot also having a frame rate of 32 frames per second. Suppose a TV set 502 has a frame rate of 256 frames per second. At this rate, the TV set 502 can be adapted to support 8 time slots each operating at 32 frames per second. In this configuration, each time slot would have a duration of approximately 488 microseconds.

The above configuration can support up to four 3D programs which can be viewed simultaneous with active shutter glasses 602 synchronized to pairs of time slots associated with each program. In the illustration of FIG. 1, two users utilize four time slots: time slots 1 and 2 for User 1, and time slots 3 and 4 for User 2. Time slots 5 through 8 are available for other users. Suppose that User 1 chose channel 8 of the STB 106 which supports a live 3D video program, and further suppose that User 2 chose channel 6 to also view a live 3D video program. During time slot 1, the shutter glasses 602 of User 1 would enable viewing of the image presented by the TV set 502 on the left lens 606 while maintaining the right lens 604 darkened (disabled). It should be noted that no other images are presented by the TV set 502 during time slot 1. In other words, during time slot 1 the STB 106 will not direct the TV set 502 to present images from the program selected by User 2 on channel 6 or images associated with the right eye for channel 8. User 2's shutter glasses maintain both lenses 604 and 606 darkened (disabled) during time slot 1. Hence, User 2 would not be able to view the left eye image of time slot 1.

Upon entering time slot 2, the STB 106 can direct the TV set 502 to present the right eye frame of channel 8 only. The shutter glass 602 of User 1 having been synchronized in step 810 to the frame rate of the TV 502, and knowing its assigned time slots (1 and 2), and their respective rates, would enable the right viewing lens 604, and darken (or disable) the left viewing lens 606 during time slot 2. Hence, User 1 would only be able to view the image presented on the TV 502 by way of the right lens 604. Again, User 2's shutter glasses would maintain both lenses 604 and 606 darkened (disabled) during time slot 2. Hence, User 2 would not be able to view the right eye image of channel 8 during time slot 2.

Upon entering time slot 3, the STB 106 can direct the TV set 502 to present the left eye frame of channel 6 only. The shutter glass 602 of User 2 having been synchronized in step 810 to the frame rate of the TV 502, and knowing its assigned time slots (3 and 4), and their respective rates, would enable the left viewing lens 606, and darken (or disable) the right viewing lens 604. Hence, User 2 would only be able to view the image presented on the TV 502 by way of the left lens 606. User 1's shutter glasses would maintain both lenses 604 and 606 darkened (disabled) during time slot 3. Hence, User 1 would not be able to view the left eye image of time slot 3.

Upon entering time slot 4, the STB 106 can direct the TV set 502 to present the right eye frame of channel 6 only. The shutter glass 602 of User 2 would enable the right viewing lens 604, and darken (or disable) the left viewing lens 606. Hence, User 2 would only be able to view the image presented on the TV set 502 by way of the right lens 604. User 1's shutter glasses would maintain both lenses 604 and 606 darkened (disabled) during time slot 4. Hence, User 1 would not be able to view the right eye image of time slot 4.

Since only one user can view one time slot with a single eye at a time, the full resolution of the TV set 502 can be viewed by each of Users 1 and 2. If the TV set 502 can support high definition resolution (e.g., 1080P), a 3D program can be viewed with the same resolution. This is in contrast with a TV set 502 having a polarized display as shown in FIG. 7. When viewing a polarized TV set, only half of the rows can be seen by each eye. Therefore, a 3D image can only be viewed with half resolution.

In another embodiment, the shutter glasses 602 of FIG. 6 can be adapted so that each lens is polarized to alternating pixel rows of the polarized TV set 502 of FIG. 7. In this embodiment, the left lens 606, for example, can be polarized to odd pixel rows 702, while the right lens 604 can be polarized to the even pixel rows 704. Since each eye is polarized to different pixel rows, the shutter glasses 602 can be adapted to enable viewing from both lenses 604, 606 simultaneously. Although half the resolution of the polarized TV set 502 is viewable by each eye, this embodiment requires only one time slot for left and right eye viewing. Accordingly, this embodiment allows the STB 106 to present eight programs, each assigned to one of time slots 1 through 8. With the four time slots illustrated in FIG. 10, four users can be viewing different programs in half 3D resolution as depicted in the timing diagram of FIG. 11.

Figure 10:
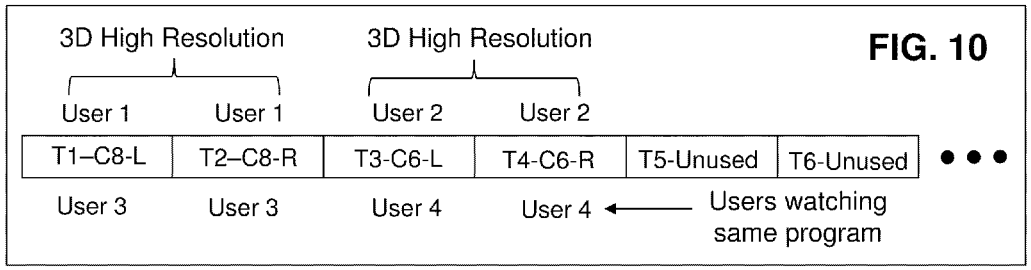
FIGS. 10-14 depict illustrative timing diagrams for presenting media content to multiple viewers.
Figure 11:
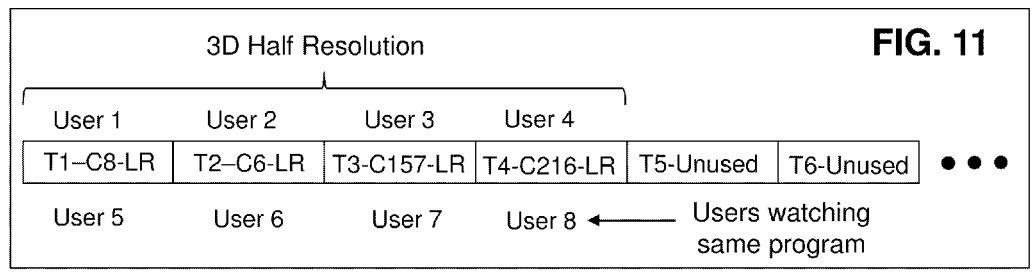

The embodiments of FIGS. 10 and 11 support more than one user viewing the same program. For example, in the illustration of FIG. 10, Users 1 and 3 can be viewing 3D channel 8, while Users 2 and 4 can be viewing 3D channel 6. Users 3 and 4 can use shutter glasses 602 synchronized to time slots 1-2, and 3-4, respectively. Similarly, with a polarized TV 502, multiple viewers are possible as shown by the addition of viewers 5-8 each utilizing shutter glasses synchronized to time slots 1-4, respectively. Accordingly, any number of duplicate viewers is possible.

The aforementioned embodiments can also be adapted for multiple program viewing of combinations of 2D and 3D configurations. For instance, in the case of a non-polarized TV set 502 as illustrated by the timing diagram of FIG. 11, the shutter glasses of User 1 can be programmed so that the left and right eye lenses 604, 606 are enabled simultaneously in time slot 1. During time slot 1, the STB 106 can be programmed to present a full resolution 2D image. During the other time slots (2-8), the shutter glasses 602 of User 1 are disabled (darkened). More than one viewer can have shutter glasses 602 synchronized to the same arrangement as another user. In this illustration, Users 1 and 4 are viewing the same program (channel 8) in 2D full resolution, while Users 3 and 6 view a 3D program in full resolution (channel 6) at the same time.

Figure 12:
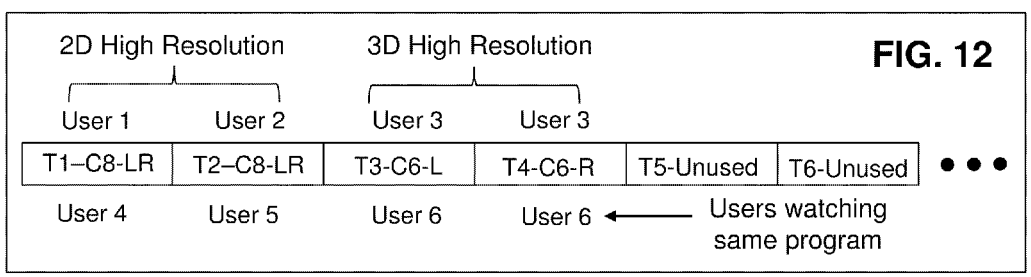
Figure 13:
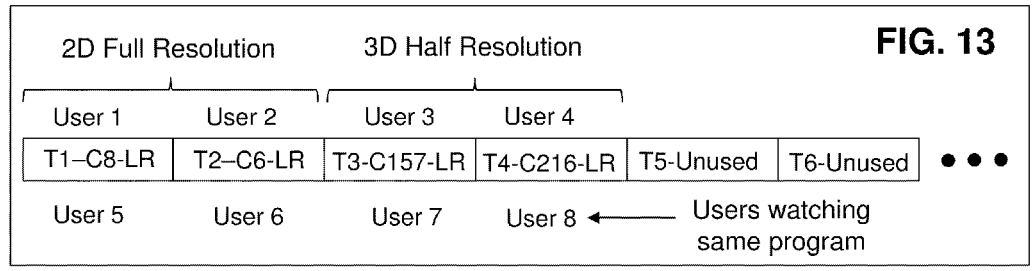

For a polarized TV set 502 as illustrated by the timing diagram of FIG. 12, the STB 106 can be programmed to present a 2D image that utilizes the odd and even pixel rows. Since all pixel rows are used, the 2D image has full resolution, while 3D images are half resolution since the right and left eye images are split between the odd and even pixel rows. As described before, the left and right lenses are enabled simultaneously during each time slot. And as before, more than one viewer can have shutter glasses synchronized to the same time slot as shown in FIG. 13. Users 1 and 5 view channel 8 in 2D full resolution, Users 2 and 6 view channel 6 in 2D full resolution, while Users 3 and 7 view channel 157 in 3D half resolution, and Users 4 and 8 view channel 216 in 3D half resolution.

Switching from 3D to 2D resolution and vice-versa can be performed with a remote controller 107 or with a toggle button on the shutter glasses 602 (not shown in FIG. 6). When a 3D to 2D or 2D to 3D change request is detected by the STB 106 in step 822, the STB 106 can repeat steps 804 through 820 and thereby resynchronize the shutter glasses 602 of the user to a new assignment of one or more time slots for 2 or 3D viewing. Similarly, a change in programming can be performed with a remote controller 107 and/or with channel change buttons on the shutter glasses 602. When a program change request is detected by the STB 106 in step 824, the STB 106 can repeat steps 816 through 820 and thereby present the shutter glasses 602 of the user with a new program.

If a change in media program is not detected in step 824, the STB 106 can determine in step 826 whether an illumination change is required. An illumination change can represent numerous embodiments. For example, a user can manipulate or verbally control the user interface 404 of the viewing apparatus 602 and thereby direct a change in illumination (e.g., increase or decrease light intensity of the image projected by the presentation device 502 in the time slots assigned for the particular user). In another embodiment, the viewing apparatus 602 can be adapted to periodically send illumination data associated with different locations of the viewing apparatus (before and after the optical elements 604, 606 as previously described). The illumination data can represent ambient light, specific spectral portions of light emitted by the presentation device 502, and/or light intensity reflected from the user's sclera or eyelid flesh.

A change in illumination can also be detected from a change in utilization. If for example a user terminates viewing of a media program and thereby frees time slots, a change in illumination is possible. Similarly, if a new user wearing a viewing apparatus requests another media program requiring the use of additional time slots, such a change can result in an adjustment to illumination.

Illumination data submitted by each viewing apparatus 602 can be autonomous and/or under the control of the STB 106 by way of bi-directional message exchanges over a wired or wireless medium.

In view of the above embodiments, an artisan of ordinary skill in the art would contemplate numerous causes for an illumination change. Additional embodiments are therefore contemplated by the present disclosure.

Figure 9:
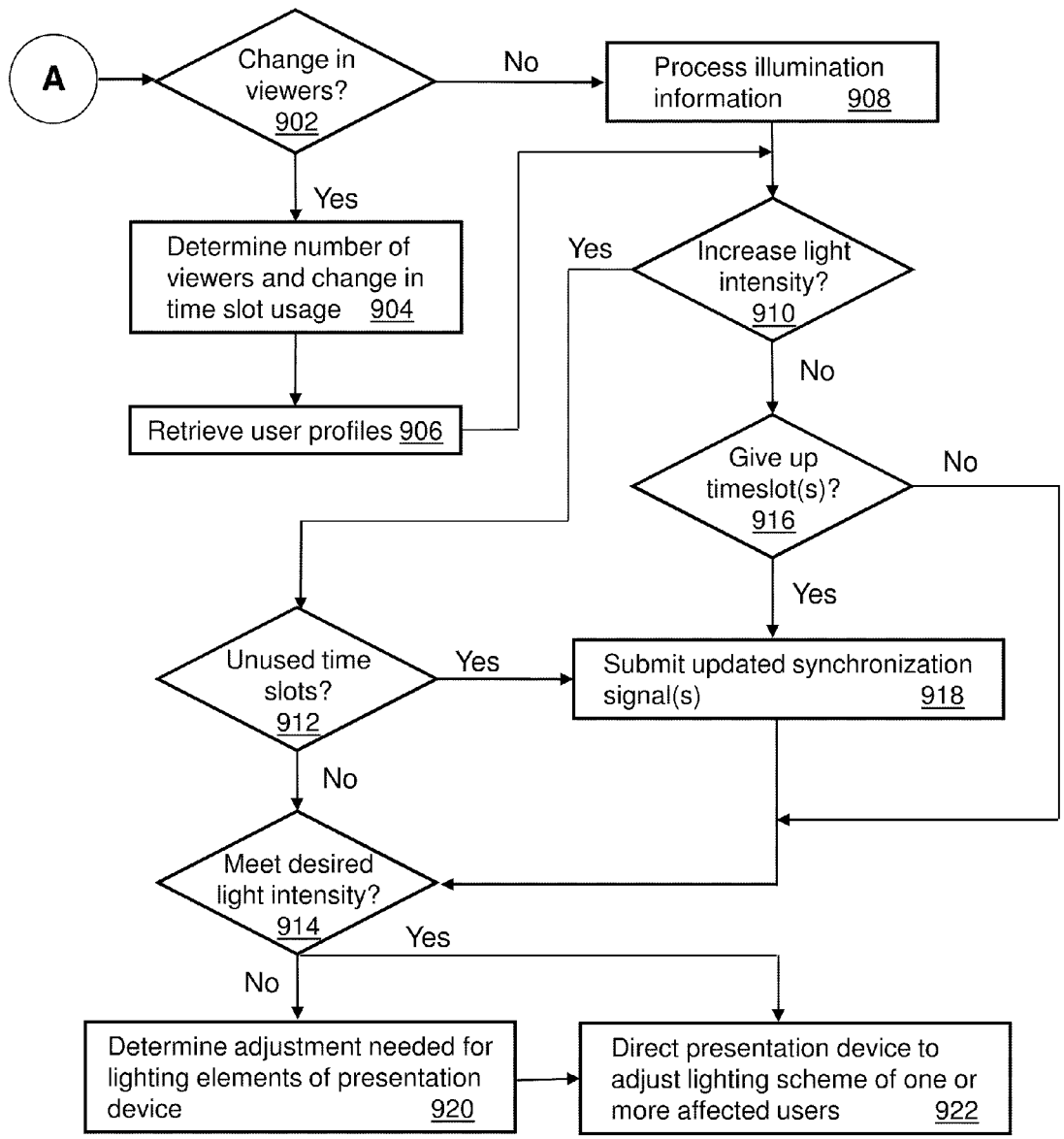

Once an illumination change is detected in step 826, the STB 106 can be adapted to determine in step 902 (see FIG. 9) whether a change in viewers is a cause of the illumination change. If it is, the STB 106 then determines in step 904 the number of viewers and any changes in time slot usage. In step 906 the STB 106 can further retrieve any user profiles associated with the viewers. The user profiles can identify viewing preferences such as contrast, light intensity in a dark room versus a well lit room, among other possible preferences. In step 910, the STB 106 can determine if the addition or departure of users, each of which may cause a change in time slot usage, requires an increase in the intensity of light emitted for particular media programs viewed by current users.

If for example previously used time slots have been released by a user who has terminated a media program, and the remaining viewer(s) could benefit from an increase in the intensity of light emitted for the respective media program(s) being viewed by them, then the STB 106 can detect this opportunity in step 910 and determine in step 912 that such unused time slots are available to update the illumination of said programs. When an unused time slot is used for this purpose, the STB 106 can submit in step 918 updated synchronization signals to the affected viewing apparatuses 602 to synchronize to a new time slot assignment scheme. In step 914, the STB 106 can then determine if the updated use of time slots is sufficient to meet a desired level of light intensity identified by a user's profile preferences. If it does, the STB 106 can proceed to step 922 and direct the presentation device 502 to adjust its lighting scheme for the one or more affected users according to a new time slot arrangement.

If the use of additional time slots falls short of a user's desired light intensity, the STB 106 can proceed to step 920 where the STB 106 determines a degree of adjustment needed for lighting elements (e.g., LEDs, plasma cells, etc.) of the presentation device 502 to achieve the desired light intensity. In this embodiment, the STB 106 can direct the presentation device 502 to present a media program utilizing additional time slots with an additional adjustment in the intensity of light emitted by the lighting elements of the presentation device 502 to make up for any shortfall in the time slot arrangement.

The aforementioned embodiment can also be applied to circumstances where a decrease in light intensity is required. For example, the STB 106 can determine in step 910 that the user has turned off or turned down lighting in a room, thus requiring less light intensity in the media program being presented. Under these circumstances, the STB 106 can proceed to step 916 where it determines if time slots are available to be given up. If the minimum time slots required are in use, then the STB 106 can proceed to steps 914-922 to decrease the intensity of light generated by the lighting elements of the presentation device 502 without an adjustment to the time slots. In this embodiment resynchronization of the viewing apparatuses is not necessary, and thus step 918 is not required.

If the viewing apparatus 602 is synchronized to more time slots than required (e.g., two time slots for the left eye, and two for the right), then the STB 106 can proceed to step 918 where it submits an updated synchronization signal to the affected viewing apparatus(es) 602 and proceeds to steps 914 for further adjustment if the decrease in light intensity falls short of a desired target, or if the decrease in light intensity by reducing the number of time slots is more than desired, in which case the STB 106 directs the presentation device 502 to increase the light intensity generated by the lighting elements during the assigned time slot arrangement.

Referring back to step 902, if the illumination change is the result of a proactive request of a user manipulating the user interface 404 of the viewing apparatus 602 to request an increase or decrease in illumination, the STB 106 can process this request in step 908 and proceed to any combination of steps 910-922 to achieve the requested adjustment. Alternatively or in combination if the change in illumination is a result of autonomous illumination measurements submitted to the STB 106 by the viewing apparatus 602 or measurements requested by the STB 106, the STB 106 can process the illumination data in step 908, retrieve user profiles where appropriate to determine if an increase or decrease in illumination is required in step 910 and repeat any combination of the steps previously described.

Figure 14:
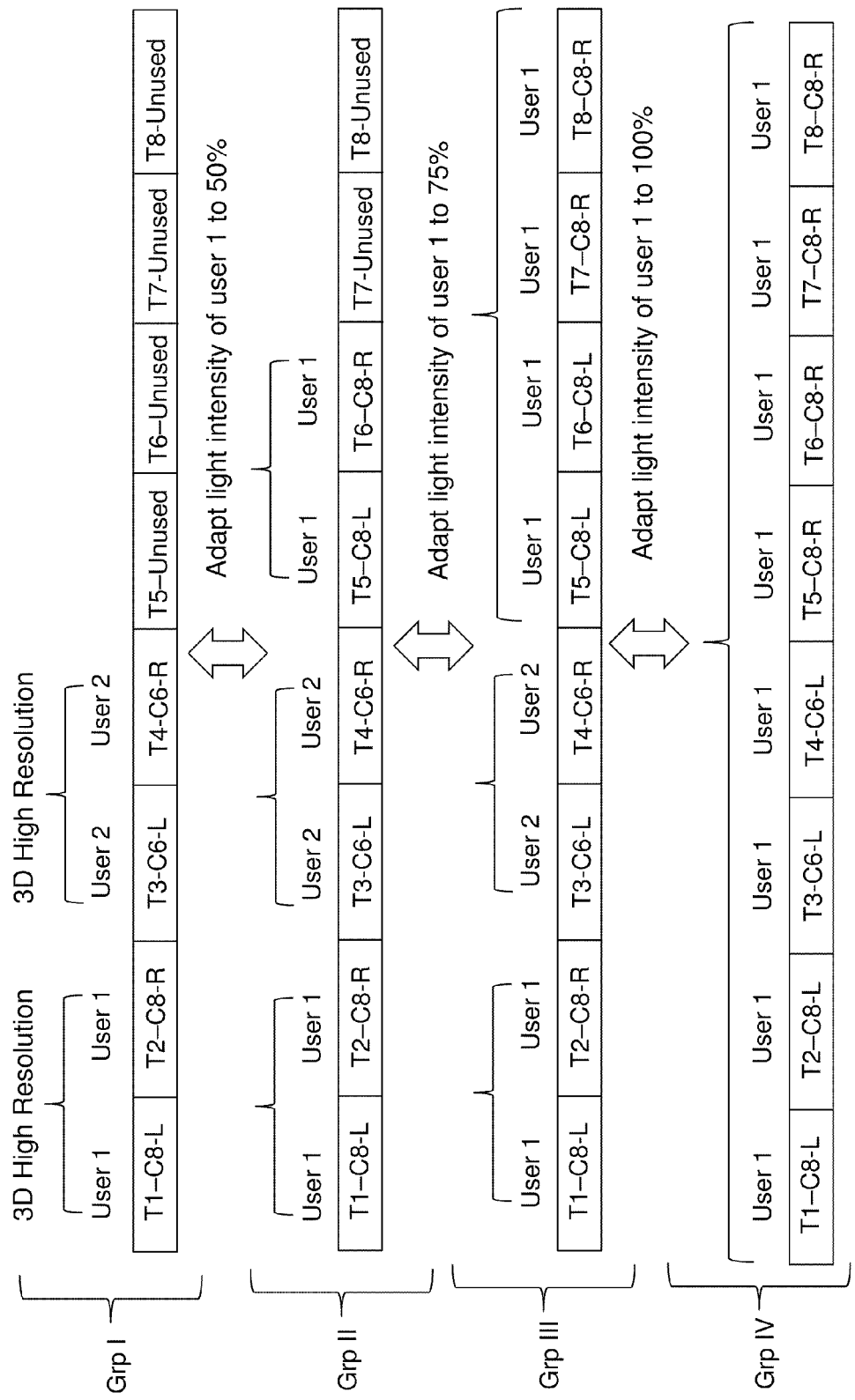

FIG. 14 illustrates a few of the embodiments described above. In this illustration four timing groups are shown (Grp I, II, III and IV) each representing a transition between time slot schemes. Group I can represent for example the initial state of two users viewing two independent media programs with overlapping presentation schedules. User 1 is viewing a 3D high resolution program on channel 8 during time slots 1 and 2, while User 2 is viewing a media program at the same resolution on channel 6 during time slots 3 and 4.

In Group II, User 1 is assumed to have requested an increase in the light intensity of the media program of channel 8. This request can be generated by a manipulation of the user interface 404 of the viewing apparatus 602 of user 1 as previously described. The STB 106 can determine as described by method 900 the availability of time slots 5 and 6 in Group I and replicate the left and right images in Group II as shown during time slots 5 and 6, respectively. To accomplish this, the STB 106 transmits a synchronization signal to the viewing apparatus 602 of user 1 so that it can now enable the optical elements during time slots 1, 2, 5 and 6.

In Group I user's 1 and 2 achieve 25% of the light intensity available by time slot management. By supplying time slots 5 and 6, user 1 sees 50% of the available light intensity while user 2 remains at 25%. If more intensity is required, time slots 7 and 8 can also be made available, which increases the intensity of light provided to 75% for user 1. If user 2 terminates its viewing of channel 6 without switching to another channel, thereby relinquishing time slots 3 and 4, then the whole spectrum of time slots can be assigned to the viewing apparatus of user 1 thereby providing said viewer 100% of the light intensity which can be managed with time slots.

This illustration can be carried in any direction or combination. For example, the light intensity presented to user 1 can be decreased by transitioning from group IV to group I in sequence or with gaps. It is further noted that if the light intensity desired by a user cannot be achieved with time slot management, the STB 106 can direct the presentation device 502 to adjust the lighting elements during the user's time slot(s) to make up for a shortfall or to adjust for an overshoot.

Figure 16:
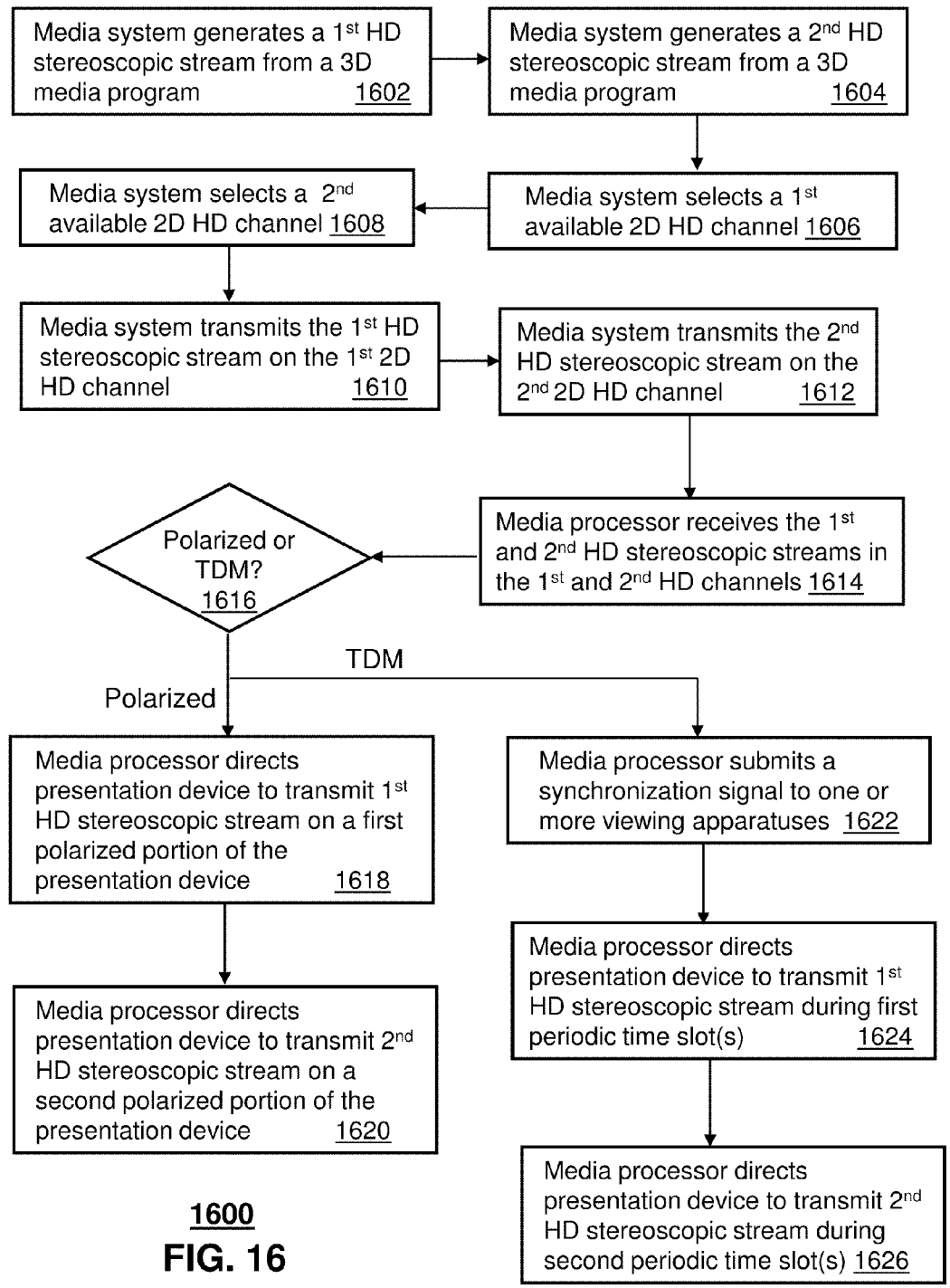
FIG. 16 depicts an illustrative embodiment of a method operating in portions of the devices and systems of FIGS. 1-7.

FIG. 16 depicts yet another illustrative embodiment of a method 1600 operating in portions of the devices and systems of FIGS. 1-7. Method 1600 presents illustrative embodiments for transmitting 3D high definition (HD) stereoscopic streams from the media systems of FIGS. 1-3 to the devices in FIGS. 4-7. Method 1600 can begin with steps 1602-1604 in which a media system generates first and second HD stereoscopic streams from a 3D media program. These steps can be responsive to, for example, a user request for an on-demand 3D movie. For user directed requests, the media system can transmit the requested movie over a unicast channel to the end user's STB 106. Alternatively, the media system can perform these steps as a general broadcast of a scheduled 3D media program. In this instance, the media program would be transmitted by the media system over a multicast channel to subscriber STBs 106 communicatively coupled to the media system.

Figure 17:
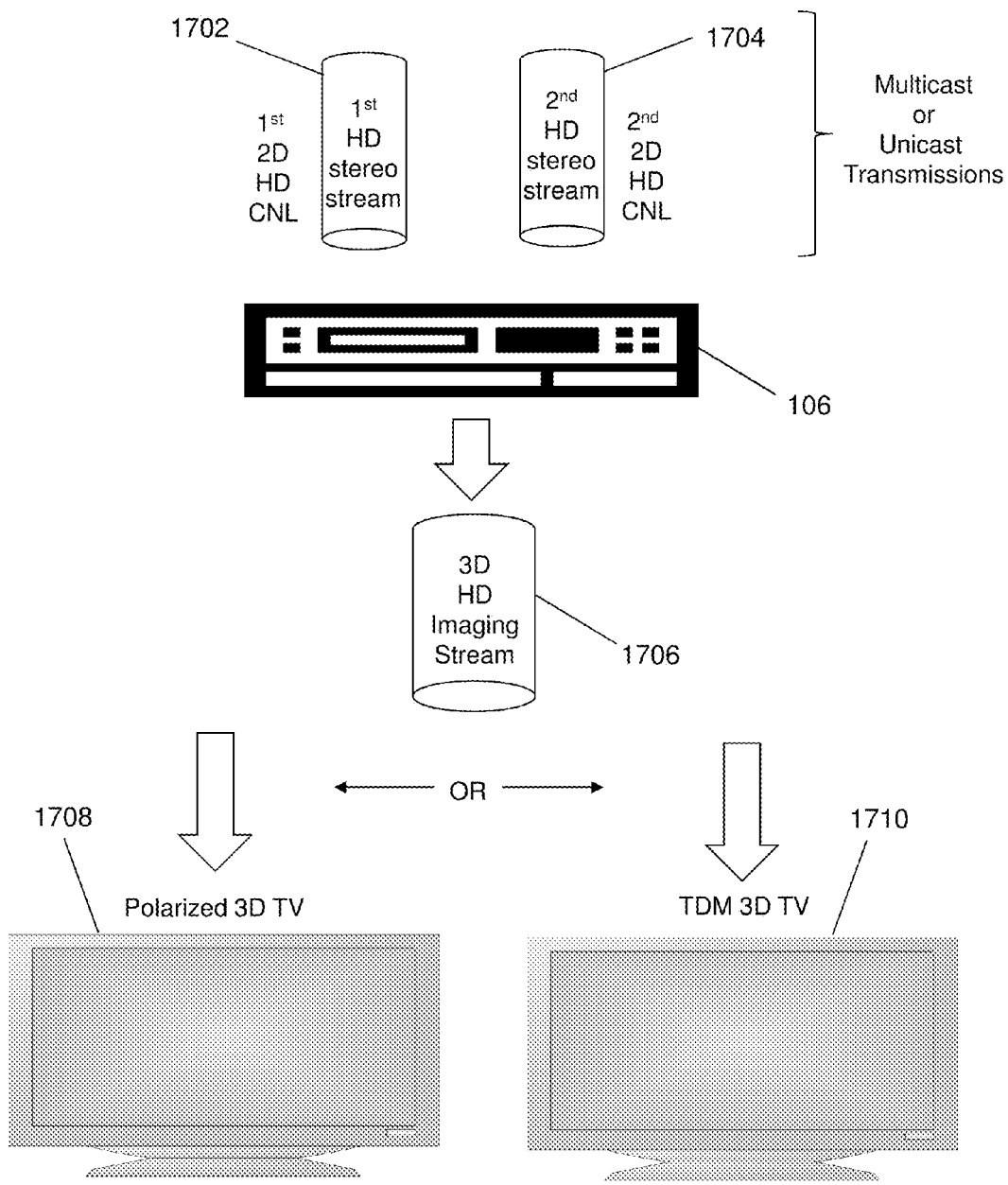
FIGS. 17-18 depict illustrative block diagrams according to the method of FIG. 16.

Once the media system has determined whether to transmit in unicast or multicast mode, it can proceed to steps 1606-1608 to select first and second 2D HD channels from the system for transporting the stereoscopic information of steps 1602-1604. Since 3D HD media content can be greater in bandwidth capacity than the streaming bandwidth a that single 2D HD channel can support, the media system can be directed in steps 1606-1608 to select two 2D HD channels to transport the two HD stereoscopic streams, respectively. An illustration of this is shown in FIG. 17 by way of references 1702-1704. Once the media system has selected two 2D HD channels, it can proceed to steps 1610-1612 to transmit the HD stereoscopic streams to one or more STBs 106 in its network.

Step 1614 presents an illustration of a media processor (referred to herein for illustration purposes as STB 106) adapted to receive the first and second HD stereoscopic streams generated by the media system. In this step, the STB 106 can be further adapted to retrieve the first and second HD stereoscopic streams from the first and second HD channels, buffer the streams, and synchronize them according to the synchronization data embedded in each stream. Once the streams have been synchronized, in step 1616, the STB 106 can determine if the presentation device that it is communicatively coupled to is a polarized device as previously discussed or one that support time-division multiplexing (TDM). If the presentation device is polarized, then the STB 106 retrieves the first and second HD stereoscopic streams from the first and second 2D HD channels, respectively, and in step 1618 directs the presentation device to transmit the first HD stereoscopic stream on a first polarized portion of the presentation device (e.g. odd rows), and the second HD stereoscopic stream on the second polarized portion of the presentation device (e.g., even rows).

An illustration of this step is given in FIG. 17 in which a 3D HD imaging stream is presented by way of media stream 1706 directed to the polarized presentation device 1708 by way of the STB 106. Although not shown in steps 1618-1620, the media processor can also transmit an audio signal associated with the 3D HD media program to viewing apparatus(es) used for viewing the polarized 3D HD media program. This provides a means for private audio consumption of the media program, which is especially useful if multiple media programs are being viewed simultaneously by multiple users with viewing apparatuses such as described earlier.

If on the other hand the STB 106 is communicatively coupled to a presentation device with TDM capability for 3D media presentation, then the STB 106 proceeds to step 1622 where it creates a time slot arrangement much like what has been previously described above, and transmits a synchronization signal to one or more viewing apparatuses. In steps 1624-1626 the media processor directs the presentation device to transmit the first and second stereoscopic streams in corresponding first and second periodic time slots for viewing. An audio signal associated with the 3D HD media program can also be transmitted to the viewing apparatus. An illustration of these steps in whole or in part is given in FIG. 17 in which a 3D HD imaging stream is presented by way of media stream 1706 directed to the TDM presentation device 1710.

It will be appreciated that any of the embodiments described above including without limitation embodiments for simultaneous viewing of multiple media programs with overlapping presentation schedules and embodiments for controlling illumination of each media program can be applied to method 1600.

Figure 20:
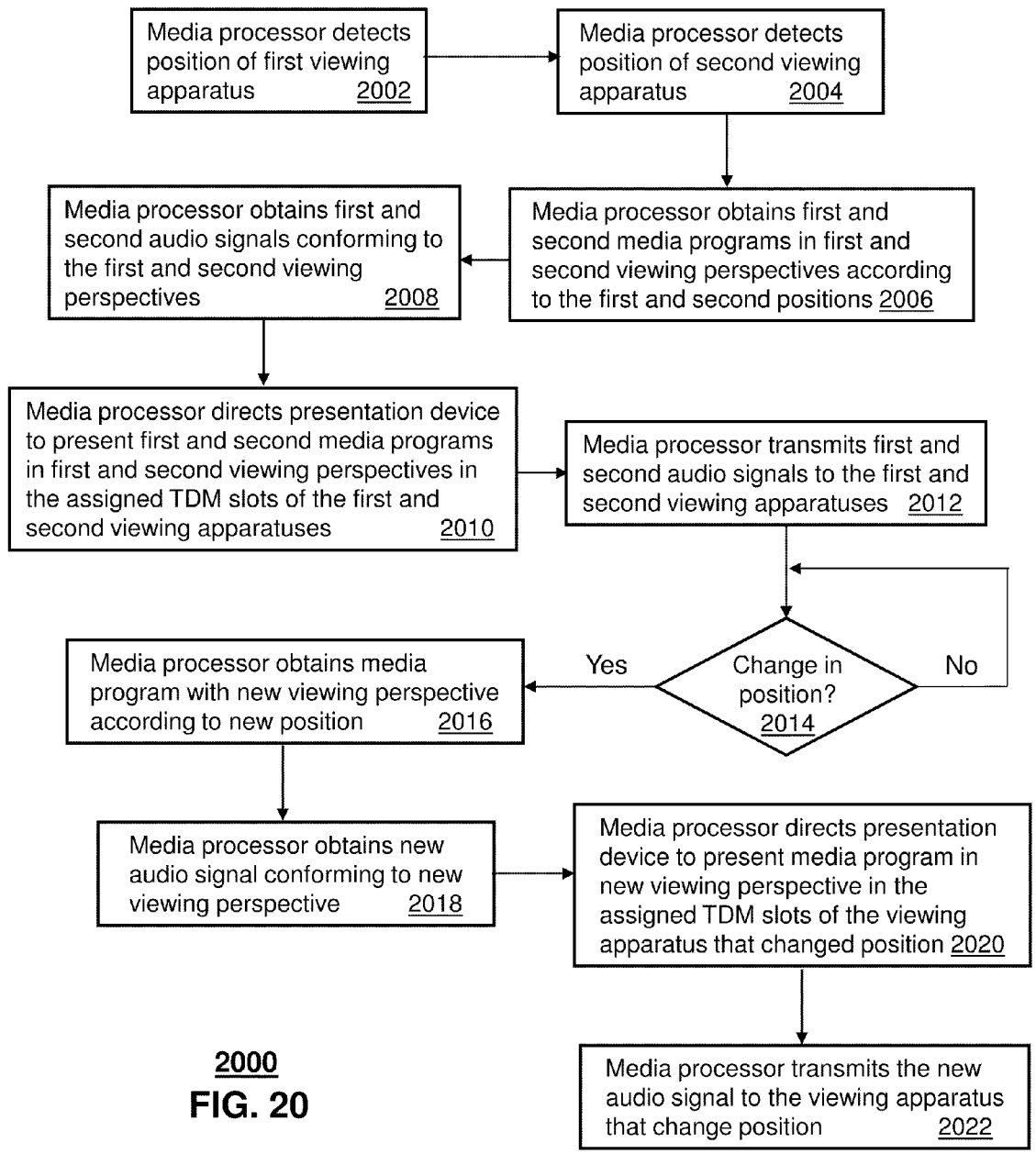
FIG. 20 depicts an illustrative embodiment of a method operating in portions of the devices and systems of FIGS. 1-7 and FIG. 21.
Figure 21:
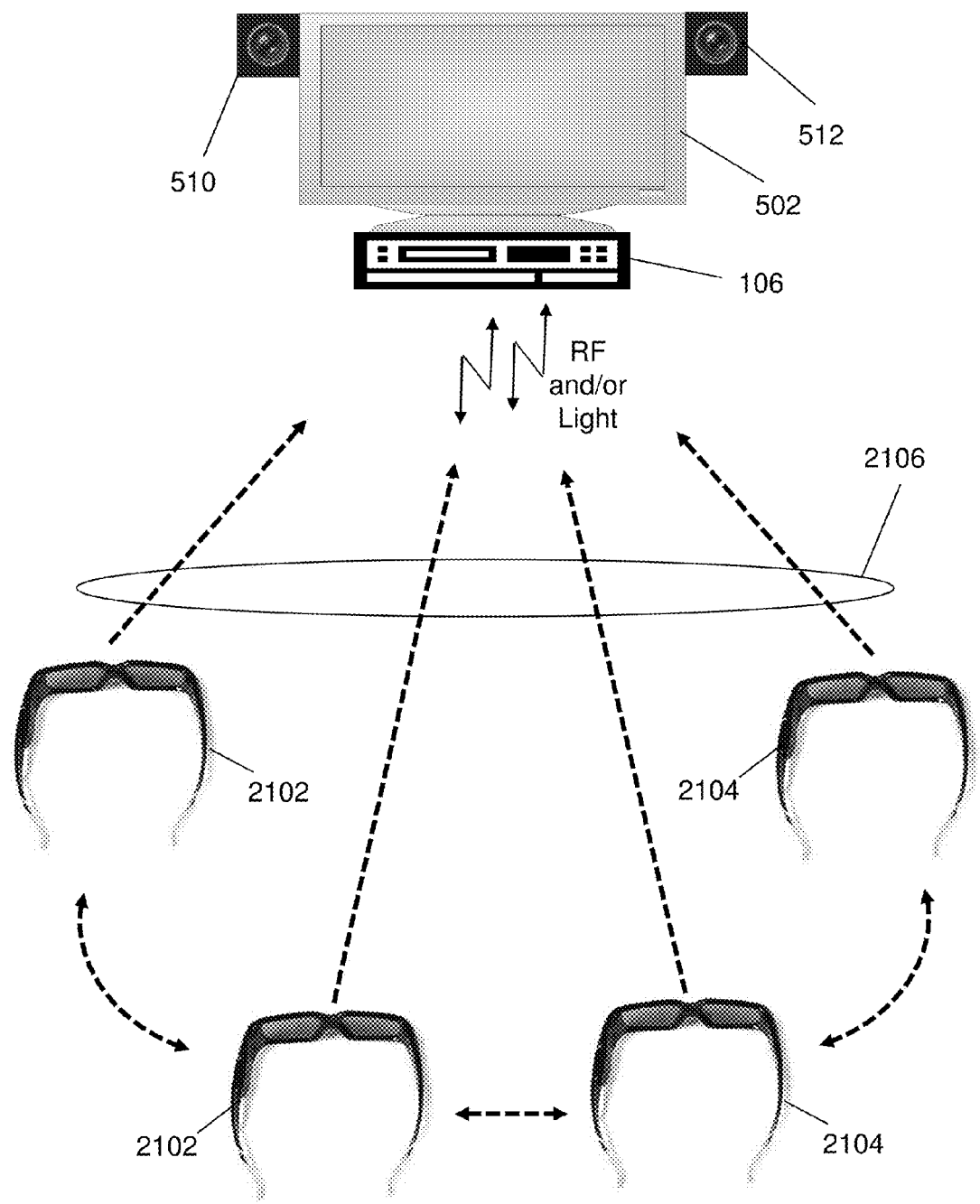
FIGS. 21-22 depict illustrative embodiments to describe the method of FIG. 20.

FIG. 20 depicts an illustrative embodiment of a method 2000 operating in portions of the devices and systems of FIGS. 1-7 and FIG. 21. Method 2000 illustrates an embodiment in which the media processor 106 can detect a position of each viewing apparatus 602 and present media programs in a viewing perspective that conforms with the position of the viewing apparatus. Method 2000 can also adjust the audio signal transmitted to each viewing apparatus 602 in accordance with the viewing perspective presented to each apparatus. For illustration purposes, the media processor 106 shall be referred to as STB 106. A first viewing apparatus will be referred to as shutter glasses 2102, while a second viewing apparatus will be referred to as shutter glasses 2104—see FIG. 21.

Method 2000 can begin with steps 2002-2004 where the STB 106 detects a first position of the first shutter glasses 2102, and a second position of the second shutter glasses 2104. The position can be a coordinate in three-dimensional (3D) space (x, y and z coordinates). The 3D space position can be used to determine the relative viewing position of a viewer wearing the shutter glasses to the presentation device 502 shown in FIG. 21. Alternatively, the first and second positions can represent a two dimensional position (x, y coordinates) that can indicate the relative viewing angle of each viewing apparatus while discounting z-height variations.

The STB 106 can detect the position of each of the shutter glasses in numerous ways. For instance, the location detector 416 embedded in the shutter glasses can indicate 3D space position relative to a light source positioned near the presentation device 502. For instance the presentation device 502, STB 106, or an accessory located near either the presentation device 502 or STB 106 (such as, for example, an infrared light source), can be detected by the location detector 416 with common infrared detection and location detection technology to determine a relative position of the shutter glasses to the presentation device 502 and/or STB 106. The location data generated by the location detector 416 can in turn be transmitted from the shutter glasses wirelessly to the STB 106. The acceleration of movement from one position to another position can be detected by a motion sensor 418 embedded in the shutter glasses 2102 and 2104. Motion data detected by the shutter glasses 2102 and 2104 can also be transmitted wirelessly to the STB 106 to enable the STB 106 to adapt to the rate of change in positions. Alternatively, or in combination, imaging sensors 510 and 512 positioned near the presentation device 502 can be used by the STB 106 to track the position of the shutter glasses utilizing common image processing software.

It will be appreciated that other tracking techniques such as triangulation suitable for locating shutter glasses 2102 and 2104 are contemplated by the present disclosure.

Once the STB 106 has detected the positions of the shutter glasses 2102 and 2104, it proceeds to step 2006 where it obtains first and second media programs having first and second viewing perspectives that correspond to first and second positions of the shutter glasses 2102 and 2104 detected by the STB 106 in steps 2002-2004. A media program in the present context can mean any form of still or moving image content which can be supplied in more than one viewing perspective. The first and second media programs can be of the same instance of media content or different instances of media content. For example, the first and second shutter glasses 2102 and 2104 can be adapted to view the same movie in different viewing perspectives or different movies in the viewing perspective suitable to the position of each of the shutter glasses 2102 and 2104. A viewing perspective can mean a viewing angle or position in 2D or a viewing angle or position in 3D such as those shown by way of reference 2106 in FIG. 21.

Figure 22:

The STB 106 can obtain more than one viewing perspective of media program(s) from a multimedia system (such as IPTV, cable or satellite systems shown in FIG. 1). A media program can have more than one viewing perspective if more than one camera is used to record media program(s). Some existing media recording devices can record more than one viewing perspective by using a multiplicity of cameras. For example, some movies include scenes recorded with more than one viewing perspective of performers by utilizing cameras covering anywhere from a few degrees to a 360 degrees. If multiple cameras are used throughout the recording of media content, it is possible for media programs to be supplied to the STB 106 in a plurality of viewing perspectives. FIG. 22 depicts an illustrative embodiment of viewing perspectives of the same person which can be achieved simultaneously with a multiplicity of image detection devices (e.g., CCD cameras). Conceivably all scenes in a movie can be recorded with multiple cameras positioned at various angles. A media program recorded in this manner can provide a multiplicity of viewing perspectives which presents an opportunity for users to view images from different vantage points.

To optimize bandwidth utilization in a multimedia communication network such as shown in FIG. 1, the STB 106 can transmit the first and second positions of the shutter glasses 2102 and 2104 to a network element of the multimedia system (e.g., a VHO server) and thereby request first and second data streams in viewing perspectives consistent with the viewing positions of the shutter glasses 2102 and 2104. Network elements of the multimedia system can utilize image processing technology to extract a single viewing perspective based on a given position of the shutter glasses 2102 and 2104. If bandwidth optimization is not a concern, or at the time the request is made by the STB 106 bandwidth utilization is low, the multimedia system can transmit the requested media program(s) in all the available viewing perspectives assuming the STB 106 has sufficient memory or buffering capacity. In this embodiment, the STB 106 can apply image processing technology to the received media programs having a multiplicity of viewing perspectives to extract a viewing perspective of interest according to the position of each of the shutter glasses 2102 and 2104.

Once the STB 106 has obtained in step 2006 first and second media programs in first and second viewing perspectives, the STB 106 can then obtain in step 2008 first and second audio signals conforming to the first and second viewing perspectives. The audio signals represent audio signals adapted to the viewing perspective recorded. Much like a multiplicity of video cameras can be used to record more than one viewing perspective, a multiplicity of microphones can be used to record sounds from each perspective. For video programs where sound is in whole or in part synthesized to include special effects, the synthesized sound can be recorded in various viewing perspectives as may be envisioned by the audio producer of the media program. Special sound effects like in surround sound systems can be adapted so that audio is location specific to the shutter glasses 2102 and 2104 since each of the shutter glasses has its own audio system as previously described for FIG. 6.

A plurality of audio signals can be transmitted to the STB 106 by the multimedia system in conjunction with the plurality of viewing perspectives. Hence, when one viewing perspective is selected by the STB 106 a corresponding audio signal conforming to the selected viewing perspective can also be selected by the STB 106. Alternatively, the STB 106 can submit a request to the multimedia system for adapted audio signals based on the first and second positions transmitted to the multimedia system. The embodiments chosen for delivery of viewing perspectives and corresponding audio signals to the STB 106 can depend on bandwidth utilization policies of the service provider of the multimedia system.

Once the first and second audio signals have been obtained in step 2008, the STB 106 proceeds to step 2010 where it directs the presentation device 502 to present the first and second media programs in the first and second viewing perspectives during the TDM slots assigned to each of the first and second shutter glasses 2102 and 2104. It is noted that SDM schemes for presenting media programs utilizing for example polarized shutter glasses and displays or autostereoscopic technology is also contemplated by the present disclosure. Contemporaneous with the presentation of the first and second media programs, the STB 106 can wirelessly transmit in step 2012 the first and second audio signals to the first and second shutter glasses 2102 and 2104.

In step 2014, the STB 106 can monitor a change in position of either of the shutter glasses 2102 and 2104. The STB 106 can detect in this step whether either of the shutter glasses 2102 and 2104 has moved in any direction (upwards, downwards, closer to the presentation device, farther away from the presentation device, a change in the viewing angle, and combinations thereof). Detection of such movement can be based on captured images by the imaging sensors 510, 512 and processing thereof by the STB 106. Alternatively, or in combination, the shutter glasses 2102 and 2104 can periodically transmit position information to the STB 106 as described earlier.

Once a new position is detected, the STB 106 can proceed to step 2016 where the STB 106 obtains the same media program being viewed by the affected shutter glasses in a viewing perspective conforming to the new position detected in step 2014. Step 2016 can take place in a manner similar to the description given for step 2006. Additionally, the STB 106 at step 2018 can obtain an audio signal adapted to the new viewing perspective in a manner similar to the description of step 2008. The STB 106 then proceeds to step 2020 where it directs the presentation device to present the media program in the new viewing perspective for the affected shutter glasses without interrupting the media program being viewed by way of the other shutter glasses in the viewing perspective originally obtained in step 2006. Contemporaneous with the adapted presentation of the media program, the STB 106 in step 2022 can transmit wirelessly the adapted audio signal to the affected shutter glasses in the new position. Method 2000 is repeated while the shutter glasses 2102 and 2104 are in active use.

It will be appreciated that under circumstances where the new position of the shutter glasses 2102 or 2104 does not conform with a pre-existing viewing perspective of the media program, the STB 106 and/or the multimedia system can be programmed to interpolate between pre-existing viewing perspectives to more accurately provide a viewer a desired perspective.

It is further contemplated that media programs can be represented by synthetic media content such as gaming content that can be controlled with common accessory control devices such as a keyboard, a mouse, a gaming console controller, and so on. In this embodiment, gamers can wear shutter glasses 602 which can be located by the STB 106 or a gaming console, and where the perspectives of the gaming content presented in 2D or 3D using TDM or SDM schemes can be adapted as described by method 2000.

It is also contemplated that a change in perspective can also represent a zoom-in or zoom-out change in perspective of a media program responsive to the STB 106 detecting a user with shutter glasses 602 moving closer to the presentation device 502, or moving away from the presentation device 502. It is also contemplated that some users may desire a fixed perspective, such as the normal perspective viewed naturally by a user which is located in a direct line of sight (perpendicular—or normal) to what's presented by the presentation device 502. Viewers who want to maintain such a perspective can request a particular viewing perspective independent of their location and to the extent possible given their location. A request for a change in the perspective of a media program can be transmitted to the STB 106 by manipulating the user interface of the shutter glasses 602 (speech command, rotation of a thumbwheel, or depression of buttons to transition between perspectives), or with a remote control 107 having a user interface that provides similar functionality.

It is also contemplated that method 2000 can be applied on a real-time basis to shutter glasses 602 that are changing location frequently due to a user's continuous movement. In other words, the adaptation of perspectives can take place in real-time. This embodiment can be especially useful in a gaming context where the user's constant motion is pertinent to the gaming content being presented. The adaptation process can take place at one or more network elements of the multimedia system of FIG. 1, at the STB 106, or combinations thereof. It is also contemplated that media processing algorithms can apply interpolation, extrapolation, or other common image processing techniques for adapting media content to a change in perspective based on a detected location of the shutter glasses 602.

Figure 23:
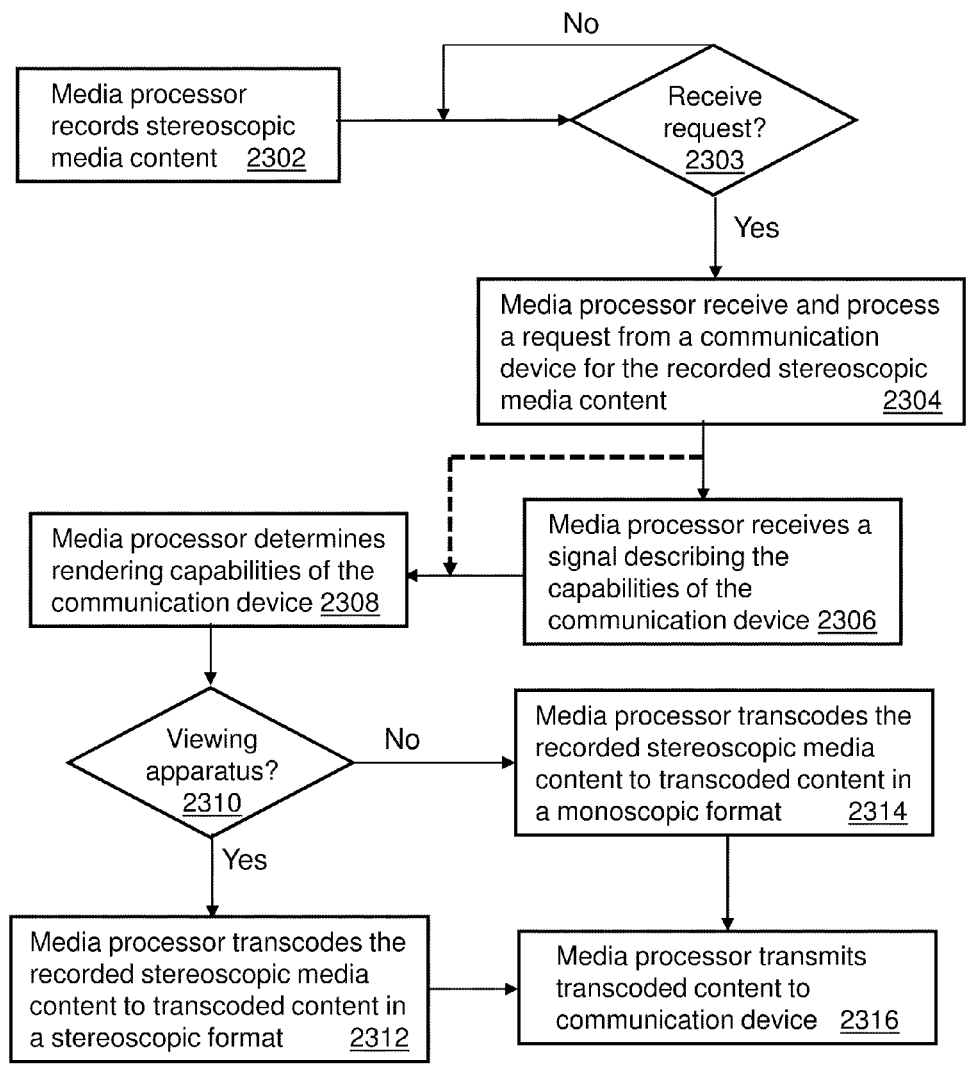
FIG. 23 depicts an illustrative embodiment of a method operating in portions of the devices and systems of FIGS. 1-7 and FIG. 24.

FIG. 23 depicts an illustrative embodiment of a method 2300 operating in portions of the devices and systems of FIGS. 1-7 and FIG. 24. Method 2300 can begin with step 2302 in which a media processor 106 records stereoscopic media content supplied by a multimedia system such as the IPTV, cable, satellite, or Internet portal system such as depicted in FIG. 1. A media processor 106 in the present context can mean an STB, DVR, or combinations thereof. For illustration purposes only, the media processor 106 will be referred to herein as DVR 106. The stereoscopic media content recorded by the DVR 106 can contain 3D still and/or 3D moving images. The recorded stereoscopic media content can represent a media program such as a TV episode, movie, documentary, or other form of stereoscopic media content that can be supplied by the multimedia system.

Figure 24:
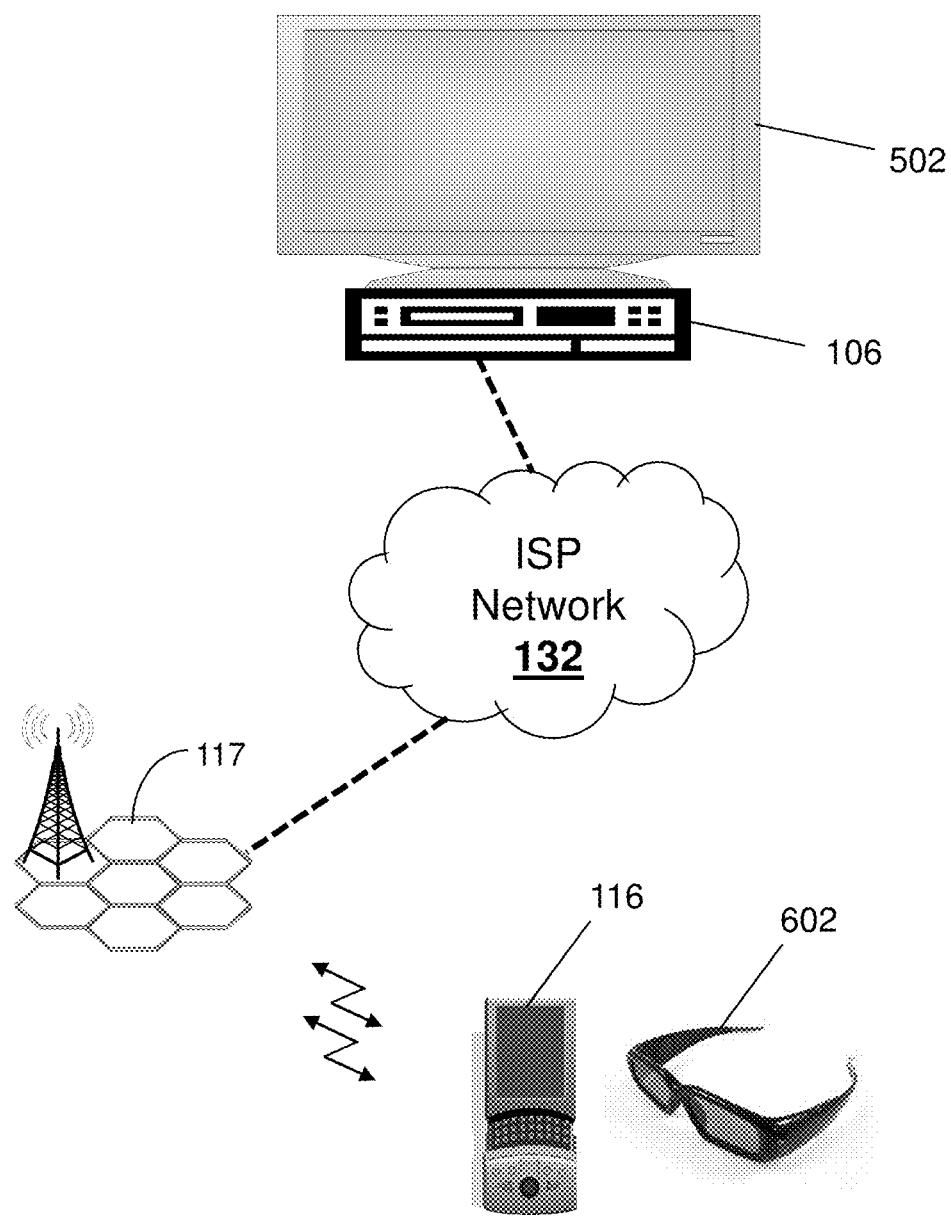
FIG. 24 depicts an illustrative embodiment to describe the method of FIG. 23.

Once recorded, the DVR 106 can monitor requests for the recorded stereoscopic media content in step 2303 from communication devices. When a request is detected, the DVR 106 can be adapted in step 2304 to receive and process a request from a communication device (such as the mobile communication device 116 of FIG. 24—herein referred to as mobile device 116) for the recorded stereoscopic media content. Inherent from information in the request or an additional signal supplied by the mobile device 116 in step 2306, the DVR 106 can determine the rendering capabilities of the mobile device 116 in step 2308. Rendering capabilities can represent, for example, dimensions of a display of the mobile device, color capabilities of the display, resolution of the display, frame rate of the display, stereoscopic capabilities of the display, an availability or lack thereof of a viewing apparatus 602 (such as shown in FIG. 24) for viewing stereoscopic images, audio system capabilities of the mobile device 116 or viewing apparatus or other suitable rendering data applicable to the present disclosure.

The DVR 106 can for example determine from the rendering information whether the original format of the recorded stereoscopic media content is compatible or incompatible with the dimensions, resolution, or color capabilities of the display. The rendering information provided by the mobile device 116 can also indicate whether the display is capable of supporting stereoscopic imagery. For example, the DVR 106 can determine from the rendering information whether the display is polarized, and/or has a fast enough frame rate to present stereoscopic images in an SDM or TDM scheme.

If neither stereoscopic presentation scheme is available, or if in step 2310 the DVR 106 determines from the data provided by the mobile device 116 that a viewing apparatus 602 is not available, the DVR 106 would know that it must transcode in step 2314 the stereoscopic media content to a monoscopic format conforming to the rendering capabilities of the display of the mobile device. If, on the other hand, the DVR 106 determines that stereoscopic viewing is possible, and that a viewing apparatus 602 is available, then the DVR 106 can proceed to step 2312 where it transcodes the recorded media content according to the rendering capabilities of the display of the mobile device in a stereoscopic format.

Transcoding in the present context can mean a digital-to-digital conversion of one encoding scheme to another. For example, the recorded stereoscopic media content may be in 1080p format for viewing by a high-definition monitor. The display of the mobile device 116 would likely have a different resolution scheme requiring the DVR 106 to transcode the resolution to the scheme supported by the display of the mobile device 116. Similarly, transcoding may be necessary to adapt to the color, frame rate, audio, stereoscopic and/or monoscopic capabilities of the mobile device 116 and/or viewing apparatus 602. Transcoding can therefore represent any useful modification or transformation of an original format of media content to a format that conforms to the rendering capabilities of the mobile device 116.

Once the DVR 106 transcodes the media content in either of steps 2312 or 2314, the DVR 106 can proceed to step 2316 where it transmits over an ISP network 132, such as shown in FIG. 24, the transcoded content to the mobile device 116 which can receive it wirelessly from a cellular, WiFi, WiMAX, or other suitable wireless base station 117. The DVR 106 can transmit the transcoded content in its entirety to the mobile device 116 for local storage and playback at the mobile device 116 at a user's leisure. Progressive download technology can be utilized to expedite playback. Alternatively, the DVR 106 can establish a communication channel utilizing a real-time protocol (RTP) to stream the transcoded content to the mobile device 116.

In the case where the DVR 106 streams in step 2316 transcoded content in a stereoscopic format, the DVR 106 can be adapted to use an SDM or TDM scheme depending on the capabilities of the viewing apparatus 602 determined from the rendering information supplied by the mobile device 116, and whether the display is polarized and/or has a frame rate that supports stereoscopic viewing in either or a combination of these multiplexing schemes. If the frame rate is sufficiently fast to support time slots, the DVR 106 can be adapted to signal the viewing apparatus 602 by way of the mobile device 116 over a wireless (e.g., Bluetooth) or wired interface to synchronize the viewing apparatus 602 to assigned time slots. An audio signal can also be transmitted with the transcoded content which the mobile device 116 can convey to the viewing apparatus 602 for playback by way of the audio system 618, 620 of the viewing apparatus 602 as previously described for FIG. 6.

In addition to the aforementioned embodiments, the DVR 106 can be adapted to receive control information generated by the viewing apparatus 602 conveyed to the DVR 106 by way of the mobile device 116. The control information can include a request to change the illumination of the transcoded stereoscopic media content in the assigned time slots using the methods described herein. In another embodiment, the DVR 106 can be adapted to detect that more than one viewing apparatus 602 is available based on the rendering information provided by the mobile device 116 or control information subsequently transmitted by an additional viewing apparatus 602. When more than one viewing apparatus 602 is available, the DVR 106 can receive a request from the mobile device 116 for more than one recorded stereoscopic media content. The DVR 106 can utilize an SDM and/or TDM scheme to accommodate simultaneous viewing by the two viewing apparatuses 602 of unrelated recorded stereoscopic media content.

It would be apparent to an artisan with ordinary skill in the art that there are many variants to the aforementioned embodiments which are suitable to the present disclosure. For example, the DVR 106 can be adapted to receive an identifier from the mobile device 116 such as its phone number, MAC address, serial number, biometric data, an alphanumeric string identifying the user of the mobile device 116, or other form of identification. With the identification data, the DVR 106 can be adapted to retrieve locally or at a remote database information relating to the rendering capabilities of the mobile device 116. In this embodiment, the mobile device 116 can be adapted to transmit a request for pre-recorded stereoscopic media content which it can select from the portal described in FIG. 3, and notify the DVR 106 whether one or more viewing apparatuses 602 are available. Other suitable variant embodiments are contemplated.

Upon reviewing the aforementioned embodiments, it would be evident to an artisan with ordinary skill in the art that said embodiments can be modified, reduced, or enhanced without departing from the scope and spirit of the claims described below. For instance, the control and sensing of light illumination can be placed on a remote controller carried by a user of the viewing apparatus and therewith submit signals to the STB 106 to achieve the desired effects described by method 900 as illustrated in part by FIG. 14.

The embodiments described above can be adapted to operate with any device capable of performing in whole or in part the steps described for method 800. For example, a cellular phone can be adapted to present two or more users wearing shutter glasses multiple programs on a single display that supports a high frame rate (e.g., 128 frames per second). Synchronization and audio signals can be transmitted to shutter glasses over for example a Bluetooth interface. Similar adaptations can be applied to media processors and presentation devices located in automobiles, airplanes or trains, just to mention a few.

In another embodiment, method 800 can be adapted to present multiple programs on a TV set utilizing autostereoscopic technology. Depending on the physical location of each user, a TV set with autostereoscopic technology can present different programs each directed to viewing zones (e.g., five 30 degree viewing zones) for viewing programs in 3D or 2D formats in each of said zones. Since autostereoscopic technology does not require shutter glasses, a user can view a program privately with only audio headphones. A user can transition between programs by physically moving between viewing zones.

Figure 15:
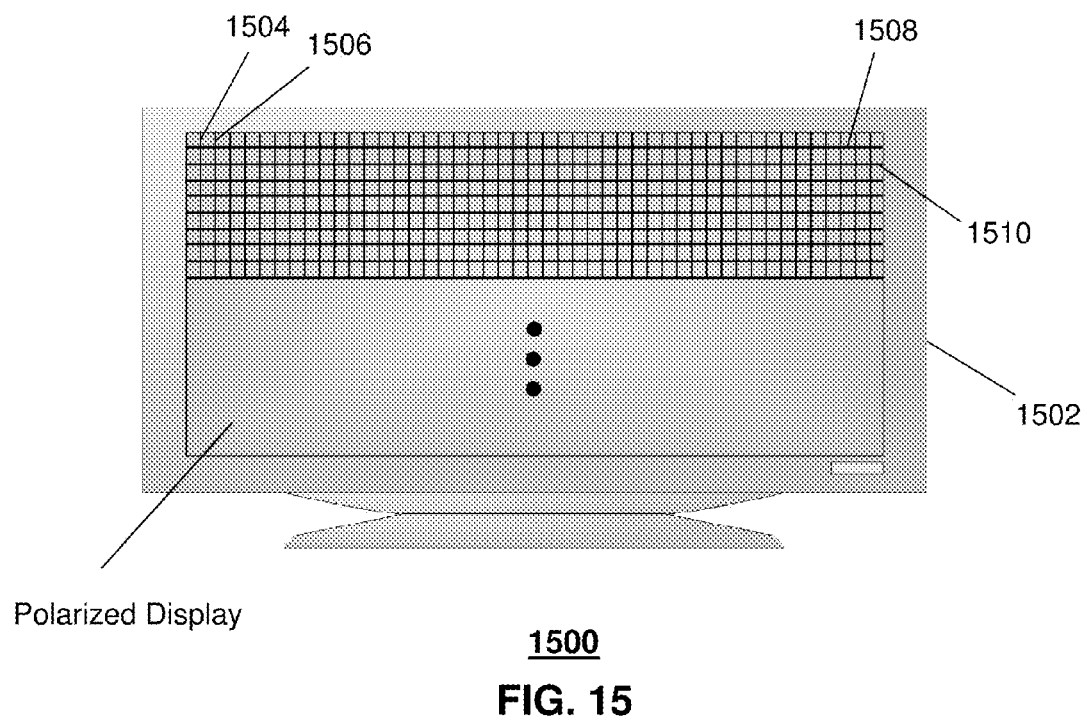
FIG. 15 depicts an illustrative embodiment of a presentation device with a polarized display.

In yet another embodiment, a presentation device 1502 such as shown in FIG. 15 can be polarized for independent viewing of pixel rows and/or columns with passive polarized glasses (i.e., no need for active shutter lenses). In this embodiment, a presentation device 1502 with a high density of pixel rows or columns can be adapted to present two or more unassociated media programs with overlapping presentation schedules which can be independently viewed by each user with polarized glasses.

In the present context, unassociated media programs can represent, for example, media programs having related content but different versions of the content such as a motion picture in which a first media program of the motion picture is R-rated, while the second media program of the motion picture is PG-13 rated with modified scenes and/or removed scenes. In another embodiment, unassociated media programs can represent, for example, two or more media programs with unrelated content (e.g., user recorded vacation video, user captured still images, HBO movie, DVR recorded program, etc.). Other variants of media programs are contemplated as possible embodiments of unassociated media programs.

In one embodiment, a first set of polarized glasses can have left and right lenses polarized equally for viewing odd pixel rows 1508 while another set of polarized glasses can have left and right lenses polarized equally for viewing even pixel rows 1510. In this scheme, media programs can be viewed in 2D. By further subdividing pixel rows, stereoscopic 3D images can be presented. For example suppose odd pixel rows are dedicated to one media program (HBO), and even pixel rows are dedicated to another unassociated media program (ESPN). For the odd pixel rows, a 3D image can be presented by presenting left and right eye stereoscopic images in alternating rows with the set of odd rows. Similarly, for the even pixel rows, a 3D image can be presented by presenting left and right eye stereoscopic images in alternating rows of the set of even pixel rows. The aforementioned embodiments can be adapted to a scheme in which odd and even pixel columns 1504, 1506 can be utilized in a similar manner to the odd and even pixel row scheme described above for presenting 2D and 3D images.

With these principles in mind, method 800 can be adapted so that an STB 106 can direct the presentation device 1502 to present a first media program in odd pixel rows, while presenting another media program unassociated to the first media program in even pixel rows while both programs have overlapping presentation schedules, which if viewed with the naked eye would seem unintelligible or distorted. Under these circumstances, a first user can view the first media program with glasses polarized to odd pixel rows without being able to view the second media program. A second user can view the second media program with glasses polarized to even pixel rows without being able to view the first media program. Method 800 can be further adapted to present the first and/or second media programs in 2D or 3D formats as previously described.

It should be noted that as presentation devices increase in resolution, additional polarization filtering of pixel rows and/or columns can be used to support viewing with polarized glasses more than two media programs with overlapping presentation schedules.

The foregoing embodiments illustrate that time division, space division, or viewer location dependency can facilitate a novel means for presenting multiple programs with overlapping presentation schedules which can be independently viewed on the same presentation device.

It is also noted that any of the embodiments presented by the present disclosure can be adapted to manipulate light waves associated with the images presented to each user. For instance, the more pixels are viewable by a user in one or more of the aforementioned embodiments, singly or in combination, the greater the intensity of the images. Accordingly, color, contrast and other imaging control functions can be manipulated by the embodiments presented herein.

It is further noted that the embodiments presented herein can operate in any device. For instance, method 800 can be adapted to operate in whole or in part at a network element of communication system 100 (e.g., at the VHS 114) rather than at a device such as the STB 106 in premises 102. Similar adaptations of the embodiments presented herein are contemplated for communication systems 200 and 300, and communication device 400. Combinations of these adaptations are also contemplated by the present disclosure.

In sum, there are multiple embodiments which are contemplated by the present disclosure which for practical reasons cannot be disclosed in there totality. Accordingly, any computational technique, modulation or functional scheme capable of producing the same or similar results to the embodiments described herein are contemplated by the present disclosure.

It would therefore be apparent to an artisan with ordinary skill in the art that other suitable modifications can be applied to the present disclosure without departing from the scope of the claims below. Accordingly, the reader is directed to the claims section for a fuller understanding of the breadth and scope of the present disclosure.

Figure 25:
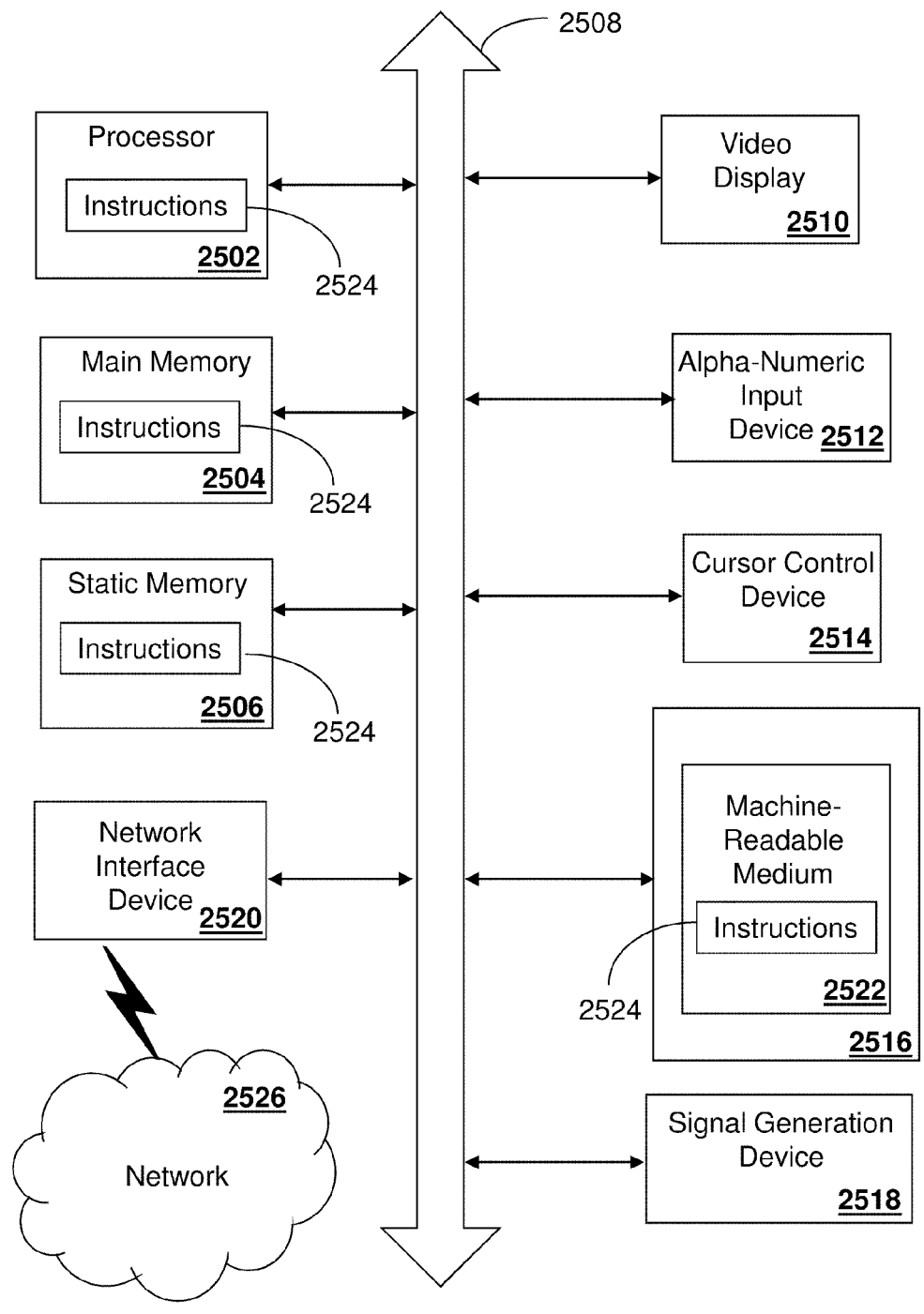
FIG. 25 is a diagrammatic representation of a machine in the form of a computer system within which a set of instructions, when executed, may cause the machine to perform any one or more of the methodologies discussed herein.

FIG. 25 depicts an exemplary diagrammatic representation of a machine in the form of a computer system 2500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU), or both), a main memory 2504 and a static memory 2506, which communicate with each other via a bus 2508. The computer system 2500 may further include a video display unit 2510 (e.g., a liquid crystal display (LCD), a flat panel, a solid state display, or a cathode ray tube (CRT)). The computer system 2500 may include an input device 2512 (e.g., a keyboard), a cursor control device 2514 (e.g., a mouse), a disk drive unit 2516, a signal generation device 2518 (e.g., a speaker or remote control) and a network interface device 2520.

The disk drive unit 2516 may include a machine-readable medium 2522 on which is stored one or more sets of instructions (e.g., software 2524) embodying any one or more of the methodologies or functions described herein, including those methods illustrated above. The instructions 2524 may also reside, completely or at least partially, within the main memory 2504, the static memory 2506, and/or within the processor 2502 during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 2524, or that which receives and executes instructions 2524 from a propagated signal so that a device connected to a network environment 2526 can send or receive voice, video or data, and to communicate over the network 2526 using the instructions 2524. The instructions 2524 may further be transmitted or received over a network 2526 via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor, comprising:
a memory that store instructions; and
a controller coupled to the memory, wherein execution of the instructions causes the controller to perform operations comprising:
storing first stereoscopic media content supplied by a multimedia system in memory as recorded stereoscopic media content;
presenting the recorded stereoscopic media content at a display device coupled to the media processor;
receiving, from a communication device, a request for the recorded stereoscopic media content, wherein the request comprises information that indicates rendering capabilities of the communication device;
generating first transcoded content by transcoding the recorded stereoscopic media content according to the rendering capabilities of the communication device;
receiving information indicating that first shutter glasses are communicatively coupled to the communication device;
receiving control information from the first shutter glasses via the communication device over a cellular communication network;
modifying the first transcoded content according to the control information that is received from the first shutter glasses to generate first modified transcoded content; and
transmitting to the communication device the first modified transcoded content over the cellular communication network, wherein the first modified transcoded content is viewable in stereoscopic form at the communication device via the first shutter glasses.

2. The media processor of claim 1, wherein the operations further comprise:
detecting second shutter glasses that are communicatively coupled to the communication device;
determining if the communication device is capable of supporting image multiplexing;
generating second transcoded content by transcoding second stereoscopic media content according to the rendering capabilities of the communication device; and
transmitting the second transcoded content to the communication device, wherein the first modified transcoded content and the second transcoded content are presented at the communication device using image multiplexing such that the first transcoded content is viewable via the first shutter glasses and the second transcoded content is concurrently viable via the second shutter glasses.

3. The media processor of claim 2, wherein the operations further comprise transmitting a first signal to the first shutter glasses via the communication device over the cellular communication network to synchronize the first shutter glasses to the first modified transcoded content that is presented at the communication device using the image multiplexing.

4. The media processor of claim 1, wherein the communication device comprises a computer or a mobile phone.

5. The media processor of claim 1, wherein the controller, responsive to executing the instructions, performs operations comprising:
receiving a request from the communication device to transcode stereoscopic media content to monoscopic media content;
transcoding the recorded stereoscopic media content to monoscopic media content according to the rendering capabilities of the communication device to generate second transcoded content; and
transmitting the second transcoded content to the communication device.

6. The media processor of claim 1, wherein the first modified transcoded content is transmitted as a packet stream according to a real-time Internet protocol.

7. The media processor of claim 1, wherein the rendering capabilities of the communication device comprise capabilities of a display of the communication device to present stereoscopic images.

8. The media processor of claim 1, wherein the rendering capabilities of the communication device comprise capabilities of a display of the communication device to process stereoscopic images.

9. A non-transitory computer-readable storage medium, comprising instructions which when executed by a processor cause the processor to perform operations comprising:
recording first stereoscopic media content received at a media processor;
presenting the stereoscopic media content at a display device coupled to the media processor;
receiving at the media processor a request for the recorded stereoscopic media content from a requesting device, wherein the request comprises information that indicates rendering capabilities of the requesting device;
transcoding the recorded stereoscopic media content according to the rendering capabilities of the requesting device to generate first transcoded content;
determining if the requesting device is capable of supporting image multiplexing;
generating second transcoded content by transcoding second stereoscopic media content according to the rendering capabilities of the requesting device; and
transmitting to the requesting device the first transcoded content and the second transcoded content over a cellular communication network, wherein the first transcoded content and the second transcoded content are presented at the requesting device via image multiplexing such that the first transcoded content is viewable in stereoscopic form at the requesting device via first shutter glasses and the second transcoded content is viewable in stereoscopic form at the requesting device via second shutter glasses.

10. The storage medium of claim 9, wherein the operations further comprise:
receiving control information from the first shutter glasses via the requesting device over a cellular communication network; and modifying the first transcoded content according to the control information that is received from the first shutter glasses to generate first modified transcoded content.

11. The storage medium of claim 9, comprising instructions that cause the processor to perform operations comprising receiving the rendering capabilities of the requesting device from a signal transmitted by the requesting device.

12. The storage medium of claim 9, wherein the operations further comprise transmitting a first signal to the first shutter glasses via the requesting device over the cellular communication network to synchronize the first shutter glasses to the first transcoded content that is presented at the requesting device via the image multiplexing.

13. The storage medium of claim 9, wherein the requesting device corresponds to a computer or mobile phone.

14. The storage medium of claim 9, comprising instructions which cause the processor to perform operations comprising:
    identifying from the request a need to transcode the recorded stereoscopic media content to monoscopic media content;
    transcoding the recorded stereoscopic media content to monoscopic media content according to the rendering capabilities of the requesting device to generate third transcoded content; and
    transmitting to the requesting device the third transcoded content.

15. The storage medium of claim 9, wherein the first transcoded content is transmitted as a packet stream conforming to a real-time Internet protocol.

16. The storage medium of claim 9, comprising instructions which cause the processor to perform operations comprising:
    detecting a lack of an availability of a viewing apparatus to view stereoscopic images on a display of the requesting device;
    transcoding the recorded stereoscopic media content to monoscopic media content according to the rendering capabilities of the requesting device to generate third transcoded content; and
    transmitting to the requesting device the third transcoded content.

17. The storage medium of claim 9, wherein the rendering capabilities of the requesting device comprise an availability or lack thereof of a viewing apparatus for viewing stereoscopic images.

18. A method, comprising:
    transmitting, by a requesting device comprising a processor, a request for recorded stereoscopic media content to a digital video recorder, wherein the request comprises information that indicates rendering capabilities of the requesting device;
    receiving, by the requesting device, control information for a digital video recorder from shutter glasses communicatively coupled to the requesting device;
    transmitting, by the requesting device, the control information to the digital video recorder; and
    receiving, by the requesting device, transcoded content from the digital video recorder over a cellular communication network, wherein the digital video recorder is operable to transcode the recorded stereoscopic media content according to the rendering capabilities of the requesting device and according to the control information and wherein the transcoded content is viewable in stereoscopic form at the requesting device via the shutter glasses.

19. The method of claim 18, comprising:
    receiving, by the requesting device, the transcoded content from the digital video recorder in a monoscopic format adapted to the rendering capabilities of the requesting device, wherein the digital video recorder detects a lack of availability of an apparatus for viewing stereoscopic images at the requesting device.

20. The method of claim 18, comprising:
    detecting, by the requesting device, an availability of a viewing apparatus for stereoscopic images;
    transmitting, by the requesting device, a signal to the digital video recorder indicating the availability of the viewing apparatus; and
    receiving, by the requesting device, second transcoded content from the digital video recorder in a stereoscopic format adapted to the rendering capabilities of the requesting device.

* * * * *